United States Patent [19]
Hashimoto et al.

[11] Patent Number: 5,519,553
[45] Date of Patent: May 21, 1996

[54] COARSE AND FINE HEAD POSITIONING APPARATUS WHICH USES A SLIDABLE SHAFT FOR FINE POSITIONING

[75] Inventors: Akira Hashimoto; Kazuo Hasegawa; Masao Sato, all of Kanagawa, Japan

[73] Assignee: Mitsubishi Denki Kabushiki Kaisha, Tokyo, Japan

[21] Appl. No.: 157,898

[22] Filed: Nov. 24, 1993

[30] Foreign Application Priority Data

Feb. 5, 1993 [JP] Japan .................................. 5-018521

[51] Int. Cl.$^6$ ......................................................... G11B 5/55
[52] U.S. Cl. .................. 360/106; 360/78.04; 360/78.05; 369/223
[58] Field of Search ............................. 360/78.04, 78.05, 360/105, 106, 109; 369/223

[56] References Cited

U.S. PATENT DOCUMENTS

| | | | |
|---|---|---|---|
| 3,774,172 | 11/1973 | Silverman | 340/173 LM |
| 4,630,145 | 12/1986 | Thompson et al. | 360/77 |
| 4,829,394 | 5/1989 | Tokuda et al. | 360/106 |
| 4,845,697 | 7/1989 | Giddings | 360/78.04 |
| 4,875,120 | 10/1989 | Takahashi et al. | 360/78.05 |
| 5,164,931 | 11/1992 | Yamaguchi et al. | 360/78.05 |

FOREIGN PATENT DOCUMENTS

| | | |
|---|---|---|
| 63-52384 | 3/1988 | Japan . |
| 64-37609 | 2/1989 | Japan . |
| 2-218073 | 8/1990 | Japan . |
| 2-272610 | 11/1990 | Japan . |
| 4-49579 | 5/1992 | Japan . |

*Primary Examiner*—Andrew L. Sniezek
*Assistant Examiner*—Larry T. Cullen
*Attorney, Agent, or Firm*—Wolf, Greenfield & Sacks

[57] ABSTRACT

This invention provides a small-sized and easy-assembling head positioning apparatus having a coarse moving mechanism and fine moving mechanism, by which the desired fine moving accuracy is easy to attain. A head positioning apparatus has a first stepping motor, a lead screw, and a cylindrical rack for coarse moving. The cylindrical rack is formed by rotating a rack around the axis of the lead screw and is provided with the lead screw. The head positioning apparatus has a second stepping motor and gears for reducing the speed of the rotation of the second stepping motor for fine moving means, and fine moving is carried out by moving the cylindrical rack by the gear. The lead screw is provided so that the first stepping motor could be moved in a X1, X2 direction in the fixed moving range.

5 Claims, 40 Drawing Sheets

43:RACK PLATE

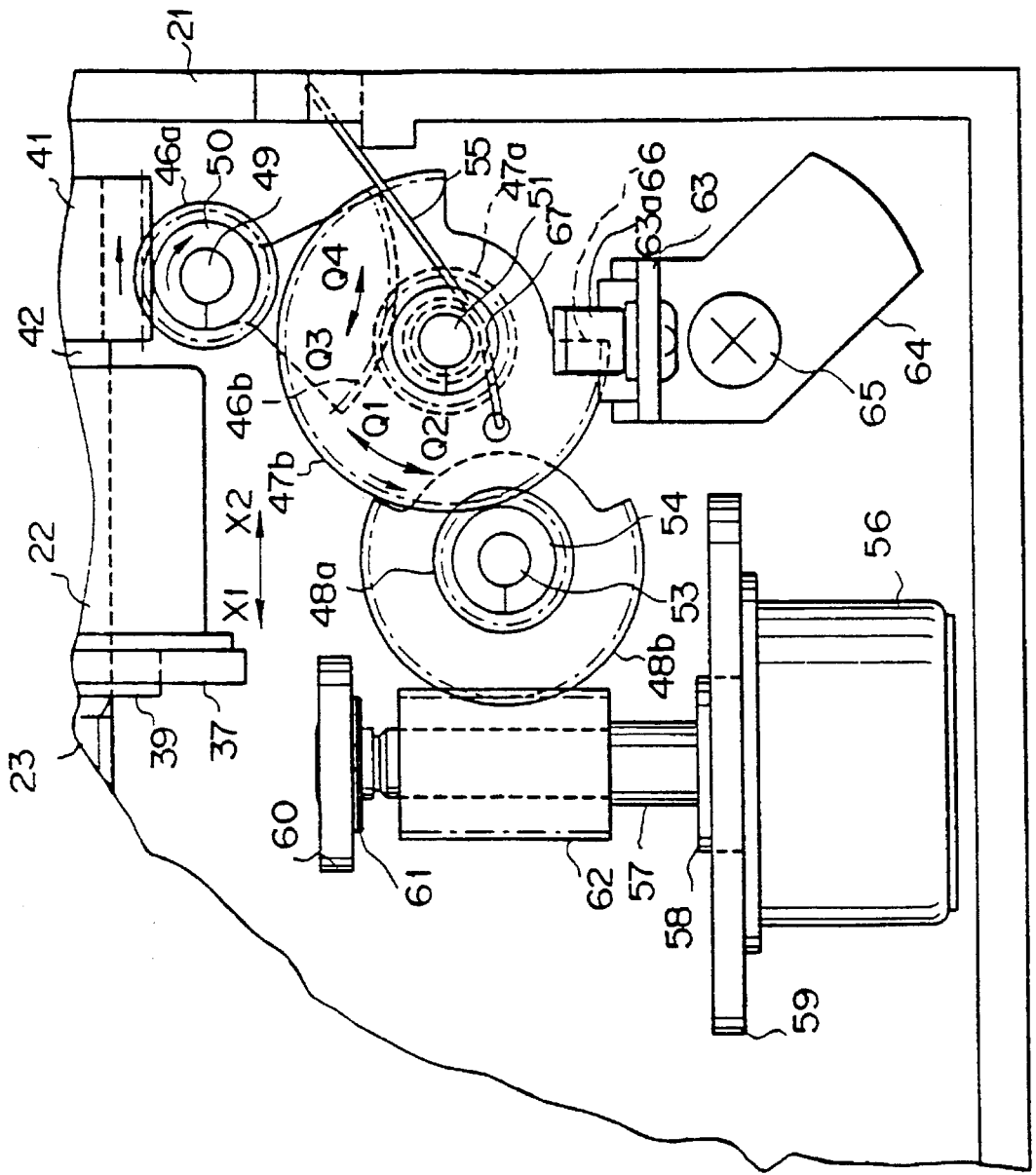

| TRACK | TRACK FOR COARSE MOVING | NUMBER OF STEPS FOR FINE MOVING |
|---|---|---|
| ⋮ | ⋮ | ⋮ |
| Y1 | x0 | Sx03 |
| Y2 | x1 | Sx11 |
| Y3 | x1 | Sx12 |
| Y4 | x1 | Sx13 |
| Y5 | x2 | Sx21 |
| Y6 | x2 | Sx22 |
| ⋮ | ⋮ | ⋮ |

ILLUSTRATION OF GEAR TRAIN MODEL

NUMBER OF TEETH OF EACH GEAR AND MOVING AMOUNT OF CYLINDRICAL RACK PER STEP OF FINE STM

| No. | NUMBER OF TEETH | | | | | | MOVING AMOUNT PER STEP (μm) |
|---|---|---|---|---|---|---|---|
| | $Z_{A1}$ | $Z_{A2}$ | $Z_{B1}$ | $Z_{B2}$ | $Z_{C1}$ | $Z_{C2}$ | |
| 1 | 30 | 15 | 36 | 15 | 42 | 15 | 3.51 |
| 2 | 32 | 16 | 38 | 16 | 44 | 16 | 3.61 |
| 3 | 34 | 16 | 40 | 16 | 46 | 16 | 3.09 |
| 4 | 34 | 16 | 40 | 16 | 47 | 16 | 3.02 |
| 5 | 34 | 16 | 41 | 16 | 47 | 16 | 2.95 |

FIG. 10

SPECIFICATIONS OF SPUR GEAR

MODULE $m = 0.3$
PRESSURE ANGLE $\alpha_0 = 20°$

| GEAR | NUMBER OF TEETH $Z$ | PITCH DIAMETER $d_0$ [mm] | NUMBER OF TEETH OF CHORDAL MEASUREMENT $Z_m$ | DISPLACEMENT OVER A GIVEN NUMBER OF TEETH $S_m$ [mm] |
|---|---|---|---|---|
| A2, B2, C2 | 16 | 4.8 | 2 | 1.396 |
| B1 | 40 | 12 | 4 | 3.268 |
| C1 | 46 | 13.8 | 5 | 4.179 |

NOTE) $Z_m = \dfrac{d_0 Z}{180} + 0.5$ $S_m = m \cos\alpha_0 \{\pi (Z_m - 0.5) + Z \,\text{inv}\, \alpha_0\}$

FIG.11

SPECIFICATIONS OF WORM GEAR (1) TOOTH PROFILE : TYPE 2

(2) NORMAL MODULE : $m_n = 0.3$ (3) PITCH DIAMETER : $d_0 = \phi 5$ (4) LEAD ANGLE $$\gamma = \sin^{-1}\frac{m_n}{d_0} = 3.440° = 3°26'23''$$

(5) AXIAL MODULE $$m_a = \frac{m_n}{\cos\gamma} = 0.3$$

(6) AXIAL PITCH : $t_a = \pi m_a = 0.943\,mm$ (7) ADDENDUM : $h_k = m_n = 0.3$ (8) DEDENDUM : $h_f = 1.25\,m_n = 0.375\,mm$ (9) OUTSIDE DIAMETER : $d_k = d_0 + 2h_k = 5.6\,mm$

(10) DEDENDUM DIAMETER : $d_f = d_0 - 2h_f = 4.25\,mm$

(11) NORMAL TOOTH THICKNESS ON PITCH CIRCLE $$S_0 = \frac{\pi m_n}{2} = 0.471\,mm$$

FIG.12

HELICAL GEAR (A1)

(1) NORMAL MODULE : $m_n = 0.3$ (2) NUMBER OF TEETH : $Z_{A1} = 34$ (3) HELIX ANGLE : $\gamma = 3°26'23''$ (4) PITCH DIAMETER : $d_0 = m_n Z / \cos\gamma = 10.218 mm$ (5) ADDENDUM MODIFICATION COEFFICIENT : $x = 0$ (6) ADDENDUM DIAMETER : $d_k = d_0 + Zm_n = 10.818 mm$ (7) NUMBER OF TEETH OF CHORDAL MEASUREMENT :

$$Z_m = \frac{\alpha_n Z}{180 \cos^3\gamma} + 0.5 = 4$$

$\alpha_n$ : CUTTER PRESSURE ANGLE ($\alpha_n = 20°$)

(8) DISPLACEMENT OVER A GIVEN NUMBER OF TEETH $$S_m = m_n \cos\alpha_n \{\pi(Z_n - 0.5) + Z \, inv\alpha_s\}$$

IN THE ABOVE EXPRESSION
$\alpha_s$ : TRANSVERSE PRESSURE ANGLE $$\alpha_s = \tan^{-1}\left(\frac{\tan\alpha_n}{\cos\gamma}\right) = 20.033°$$

$$inv\,\alpha_s = \tan\alpha_s - \pi\alpha_s/180$$

$\therefore S_m = 3.250 mm$

FIG.13

LOAD APPLIED TO EACH GEAR AND FINE STM BY SPRING FORCE F OF BIAS SPRING FOR LEAD SCREW (1) TORQUE $T_C$ APPLIED TO GEAR C $$T_C = F \times \frac{0.48}{2} \quad [gf\,cm]$$

(2) TORQUE $T_B$ APPLIED TO GEAR B $$T_B = \frac{T_C}{1.38/2} \times \frac{0.48}{2} \quad [gf\,cm]$$

(3) TORQUE $T_A$ APPLIED TO GEAR A $$T_A = \frac{T_B}{1.2/2} \times \frac{0.48}{2} \quad [gf\,cm]$$

(4) FORCE $F_W$ APPLIED TO WORM GEAR $$F_W = \frac{T_C}{1.022/2} \quad [gf]$$

(5) LOAD TORQUE $T_W$ APPLIED TO FINE STM $$T_W = F_W \tan(\gamma + \tan^{-1} \mu/\cos\alpha_n)\, r_w \quad [gf\,cm]$$

$\mu$ : COEFFICIENT OF FRICTION BETWEEN WORM AND GEAR C ($\mu = 0.2$)

$r_w$ : PITCH RADIUS OF WORM GEAR ($r_w = 0.25\,cm$)

NOTE) PITCH DIAMETER OF EACH GEAR (cm)

| GEAR | DIAMETER |
|---|---|
| C2 | 0.48 |
| C1 | 1.38 |
| B2 | 0.48 |
| B1 | 1.2 |
| A2 | 0.48 |
| A1 | 1.022 |

FIG.14

LOAD TORQUE APPLIED TO EACH GEAR AND FINE STM
BY FORCE F OF BIAS SPRING FOR LEAD SCREW

| SPRING THICKNESS $t$ [mm] | SPRING FORCE $F$ [gf] | TORQUE  $T$  [gf cm] | | | |
|---|---|---|---|---|---|
| | | $T_C$ | $T_B$ | $T_A$ | $T_W$ |
| 0.13 | 132.4 | 31.78 | 11.05 | 4.42 | 0.599 |
| 0.14 | 165.4 | 39.7 | 13.81 | 5.52 | 0.749 |
| 0.15 | 203.4 | 48.82 | 16.98 | 6.79 | 0.921 |

FIG.15

ANGLE OF ROTATION OF
WORM AND EACH GEAR [deg.]

| | ANGLE OF ROTATION |
|---|---|
| WORM | 18 |
| GEAR A | 0.529 |
| GEAR B | 0.212 |
| GEAR C | $7.366 \times 10^{-2}$ |

FIG. 16
$$es_1 = \frac{0.014}{m\pi} \times 100 = 1.49\%$$
$$es_2 = \frac{0.013}{m\pi} \times 100 = 1.38\%$$
$$es_3 = \frac{0.016}{m\pi} \times 100 = 1.70\%$$
TOTAL ERROR IS CALCULATED AS FOLLOWS
$$ep = \sqrt{2es_1^2 + 4es_2^2 + 2es_3^2} = 4.22\% \ (3\sigma)$$
$$5.49\% \ (3.9\sigma)$$
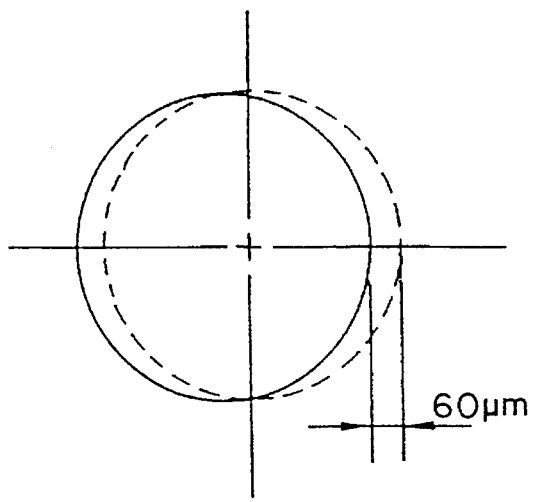
FIG. 17(a)
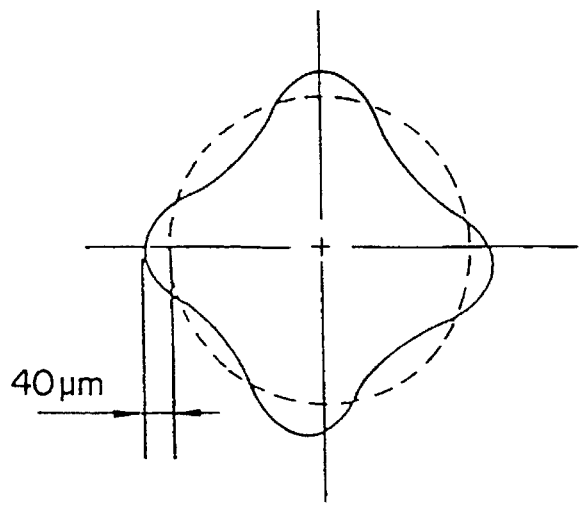
FIG. 17(b)

FIG.18

MOVING ERROR BY PITCH ECCENTRICITY IS CALCULATED AS FOLLOWS $$e_e = \sqrt{\sum_{i=1}^{7} e_{ei}^2} \quad = 4.86\% \ (3\sigma)$$
$$6.32\% \ (3.9\sigma)$$

FIG.19

MOVING ERROR BY FINE STM (1) ERROR BY STM ITSELF
$$e_{m1} = 2.67\%$$

(2) ERROR BY LOAD TORQUE
LOAD TORQUE IS 0.921 gfcm
$$e_{m2} = \frac{6}{10\,gfcm} \cdot \frac{0.921\,gfcm}{18} \times 100 = 3.07\%$$

FIG.20

$$e_t = \sqrt{2e_{s1}^2 + 4e_{s2}^2 + 2e_{s3}^2 + \sum_{i=1}^{7} e_{ei}^2 + e_{m1}^2 + e_{m2}^2}$$
$$= 7.62\% \quad (3\sigma)$$
$$9.90\% \quad (3.9\sigma)$$

FIG.21

VARIATION OF TEMPERATURE $\Delta t$ [°C]

COEFFICIENT OF THERMAL EXPANSION OF ALUMINUM $\alpha_a = 23.8 \times 10^{-6}$ [1/°C]

COEFFICIENT OF THERMAL EXPANSION OF POM $\alpha_p = 13 \times 10^{-5}$ [1/°C]

COEFFICIENT OF THERMAL EXPANSION OF BRASS $\alpha_c = 18.4 \times 10^{-6}$ [1/°C]

(1) DISLOCATION BY CHANGE OF DISTANCE BETWEEN AXES OF FINE STM AND LAST STAGE GEAR (GEAR C)

$$\delta_1 = \alpha_a \Delta t (18.121^{*1)} - 7.4^{*2)} \tan 20°)$$

NOTE *1) X DIRECTIONAL DISTANCE
*2) Y DIRECTIONAL DISTANCE (2) DISLOCATION BY DISTANCE BETWEEN AXES OF EACH TWO GEARS $$\delta_2 = 4.8 \frac{16}{46} \alpha_a \Delta t \tan 20° \left( \frac{7.6}{10.218} \frac{16}{40} + \frac{8.4}{12} \right)$$

(3) DISLOCATION BY EXPANSION OF EACH GEAR $$\delta_3 = 4.8 \frac{16}{46} \alpha_p \Delta t \tan 20° \left( \frac{7.6}{10.218} \frac{16}{40} + \frac{8.4}{12} \right) - 2.4 \alpha_p \Delta t \tan 20°$$

(4) DISLOCATION BY DISTANCE BETWEEN AXES OF FINE AND COARSE STMs $$\delta_4 = 12.5 \alpha_a \Delta t \tan 20°$$

(5) DISLOCATION BY EXPANSION OF CYLINDRICAL RACK $$\delta_5 = -2.7 \alpha_c \Delta t \tan 20°$$

FIG. 26

SPECIFICATIONS OF WORM GEAR (1) NORMAL MODULE : $m_n = 0.3$ (2) AXIAL MODULE : $m_a = m_n / \cos\gamma$
$= 0.3 / \cos 3.440°$
$\fallingdotseq 0.3$
($\gamma$: LEAD ANGLE IS CALCULATED IN (3))

(3) LEAD ANGLE : $\gamma$
$\tan\gamma = \dfrac{m_a}{d_1} = \dfrac{m_a}{d_1 \cos\gamma}$ $\therefore \sin\gamma = \dfrac{m_n}{d_1} = \dfrac{0.3}{5} = 0.06$ $\therefore \gamma = 3.440°$ (4) AXIAL PITCH : $t_a$
$t_a = \pi m_a = 0.944$ (5) ADDENDUM : $h_{k_1} = m_n = 0.3$ (6) DEDENDUM : $h_{f_1} = 1.25\, m_n = 0.375$ (7) OUTSIDE DIAMETER: $d_{k_1} = d_1 + 2 h_{k_1} = 5.6$ (8) DEDENDUM DIAMETER: $d_{f_1} = d_1 - 2 h_{f_1} = 4.25$

FIG. 27

SPECIFICATIONS OF HELICAL GEAR (1) NORMAL MODULE : $m_n = 0.3$ (BEFOREMENTIONED)

(2) NUMBER OF TEETH : $Z = 20$ (BEFOREMENTIONED)

(3) HELIX ANGLE : $\gamma = 3.440°$ (= LEAD ANGLE OF WORM)

(4) PITCH DIAMETER : $d_2$ $$d_2 = \frac{Z m_n}{\cos\gamma} = 6.011$$

(5) ADDENDUM MODIFICATION COEFFICIENT : $x = 0$ (6) ADDENDUM DIAMETER : $D_2 = d_2 + 2 m_n = 6.611$ (7) ROOT DIAMETER : $D_3 = d_2 - 2 \times 1.25 m_n = 5.261$ (8) DISPLACEMENT OVER A GIVEN NUMBER OF TEETH : $S_{m1}$ NUMBER OF TEETH OF CHORDAL MEASUREMENT : $Z_{m1} = \alpha_n Z_{v1}/180 + 0.5$ $\alpha_n$ : CUTTER PRESSURE ANGLE $= 20°$ $Z_{v1} = Z / \cos^3 \gamma$ ∴ $Z_{m1} = 2.734 \rightarrow 2$ TEETH

DISPLACEMENT OVER A GIVEN NUMBER OF TEETH $$S_{m1} = m_n \cos\alpha_n \{ \pi (Z_{m1} - 0.5) + Z \operatorname{inv}\alpha_s \} + 2x m_n \sin\alpha_n$$

$\alpha_s$ : TRANSVERSE PRESSURE ANGLE $= \tan^{-1}\left(\frac{\tan\alpha_n}{\cos\gamma}\right)$ $\operatorname{inv}\alpha_s = \tan\alpha_s - \pi\alpha_s/180$ ∴ $S_{m1} = 1.413$ (9) DISTANCE BETWEEN CENTERS OF WORM AND HELICAL GEAR

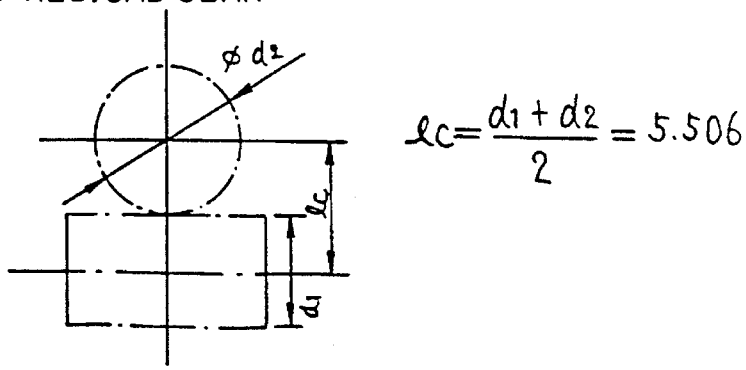

$$\ell_c = \frac{d_1 + d_2}{2} = 5.506$$

θ-T CHARACTERISTICS OF ⌀15 STM

θ-T CHARACTERISTICS OF ⌀15 STM

θ-T CHARACTERISTICS OF ⌀10-L8STM

θ-T CHARACTERISTICS OF ⌀10-L8STM

θ-T CHARACTERISTICS OF ⌀10-L8STM $$e = \sqrt{e_{11}^2 + e_{12}^2 + e_{21}^2 + e_{22}^2 + e_{31}^2 + e_{32}^2 + e_4^2}$$

$$= 11.0 \% \ (3\sigma)$$

→ ASSUMED TO BE 14.3% IN CASE OF 3.9σ

204: GUIDE ROD
205: STEPPING MOTOR
219: MOVING UNIT
202: AXIS
200: STEEL BELT
201: PULLEY

COARSE AND FINE HEAD POSITIONING APPARATUS WHICH USES A SLIDABLE SHAFT FOR FINE POSITIONING

BACKGROUND OF THE INVENTION

1. Field of the Invention

This invention relates to read/write head positioning mechanism for a magnetic or optical disk storage system.

2. Description of the Related Art

Conventional art 1.

FIG. 51 shows a conventional head positioning mechanism as disclosed in U.S. Pat. No. 4,630,145. A floppy disk 1 is used as a recording medium. A carriage 2 mounts a head 3. A first stepping motor 5 ("stepping motor" is abbreviated to "STM" hereinafter) has a first lead screw 4. Guide rods 6, 7 support the carriage 2 so that the carriage could slide bi-directionally as shown by arrows X1, X2. A rotor 8 is provided and combined with the first lead screw 4 to form a single unit. The first lead screw 4 and the carriage 2 are engaged. The carriage 2 can be moved bi-directionally, as shown by arrows X1, X2, by a rotation of the first lead screw 4 of the first STM 5.

A second STM 9 has a second lead screw 10. The first STM 5 and the second STM 9 are fixed to a frame 11 so that the first lead screw 4 and the second lead screw 10 could be parallel. The first bearing 12 holds the extended shaft of the first lead screw 4 at the front of the first STM 5. The first bearing 12 is able to slide bi-directionally as shown by arrows X1, X2. A second bearing 13 holds the extended shaft of the first lead screw 4 at the rear of the first STM 5. A bias spring 14 biases the first lead screw 4 to the direction as shown by arrow X1.

One end of a lever arm 15 contacts a post 16, and the other end is engaged with the second lead screw 10. The extended shaft of the first lead screw 4 penetrates the lever arm 15 in such fashion that the first lead screw 4 can rotate freely. The first lead screw 4 is located between the second lead screw 10 and the post 16. The lever arm 15 has a contact point 17, contacting the first bearing 12. The lever arm 15 pivots around the post 16 bi-directionally, as shown by arrows Q1, Q2 in FIG. 51, by a rotation of the second lead screw 10. The first bearing 12 moves bi-directionally, as shown by arrows X1, X2, when the lever arm 15 pivots bi-directionally as shown by arrows Q1, Q2. With this pivot, the first lead screw 4 moves bi-directionally as shown by arrows X1, X2.

An operation is explained hereinafter. The carriage 2 can be moved bi-directionally, as shown by arrows X1, X2, by a rotation of the first lead screw 4 of the first STM 5. In this way, the head 3 can be positioned coarsely over the floppy disk 1. And, the lever arm 15 pivots bi-directionally as shown by arrows Q1, Q2 by a rotation of the second lead screw 10 of the second STM 9. This causes the first lead screw 4 to move bi-directionally as shown by arrows X1, X2. Therefore, the carriage 2 is also moved bi-directionally, as shown by arrows X1, X2. In this way, the head 3 can be positioned finely over the floppy disk 1. By utilizing a principle of leverage, the displacement of the engaged part of the lever arm 15 with the second lead screw 10 is reduced. The lever arm 15 transmits the reduced displacement to the first lead screw 4.

Conventional art 2.

FIG. 52 illustrates "Head Moving Apparatus", described in Japanese Unexamined Patent Publication No. 52384/ 1988. According to this mechanism, the head 3 is moved coarsely by a rotation of the lead screw 4 of the STM 5 (STM for coarse moving). The head is moved finely by an axial movement of the lead screw 4 by the STM 9 (STM for fine moving). A motor shaft 5a of this STM 5 and the lead screw 4 of this STM 5 are formed separately, and a rotation transmission means 5b, which transmits a rotation of the STM 5 to the lead screw 4, is provided. Namely, the lead screw 4 is rotated by the STM 5 through the rotation transmission means 5b, and only the lead screw 4 is moved in its axial direction by the fine moving mechanism.

PROBLEMS TO BE SOLVED BY THE INVENTION

The head positioning mechanism shown in the conventional art 1 is configured as described above. Reduction of displacement is carried out by utilizing a principle of leverage, so that the ratio of L2/L1 needs to be large to position the head 3 finely by the second STM 9. The lever arm 15 thus needs to be long and it is difficult to get a small-sized apparatus. And, the head 3 is positioned finely by the moving of the first bearing 12. Friction is caused by the movement of the first bearing 12, and this causes a problem that the desired positioning accuracy can not be provided. To eliminate this friction, the portion that the first bearing 12 fits to needs to be long. Therefore, the apparatus becomes large. Furthermore, the first lead screw 4 needs to penetrate the lever arm 15, and the carriage 2 needs to be engaged with the first lead screw 4. This causes another problem in that assembling these parts is difficult.

Furthermore, according to the conventional art 2, the motor shaft and the lead screw of the STM for coarse moving are formed separately in the head moving mechanism. Thus, the rotation transmission means is needed to transmit the rotation of the STM for coarse moving to the lead screw, and there is a problem that to get a small-sized apparatus is difficult.

SUMMARY OF THE INVENTION

This invention seeks to solve the above problems by providing a head positioning apparatus that can obtain the desired fine positioning accuracy and can fit in a small-sized apparatus.

The head positioning apparatus for moving and positioning a head over a media according to one aspect of the present invention may include:

(a) a carriage for mounting the head;

(b) first drive mechanism for providing a lead screw having an axis for rotation and engaging with the carriage, and moving the carriage by rotating the lead screw;

(c) a cylindrical rack attached to the lead screw as a rotor formed by a rotation of a rack around the axis of the lead screw;

(d) a gear having a gear axis, engaging with the cylindrical rack; and (e) second drive mechanism for driving the gear and moving the cylindrical rack bi-directionally along the axis of the lead screw.

The head positioning apparatus may further include:

(a) a carriage for mounting the head;

(b) first drive mechanism for moving the carriage bi-directionally by engaging with the carriage;

(c) a holder for mounting the first drive mechanism and being possible to be moved bi-directionally along the direction of the carriage's movement; and (d) second drive mechanism for moving the holder bi-directionally along the direction of the carriage's movement.

The head positioning apparatus may include:

(a) a carriage for mounting the head;

(b) first drive mechanism for providing a first lead screw having an axis for rotation and engaging with the carriage, and moving the carriage by rotating the first lead screw;

(c) a holder for mounting the first drive mechanism and being possible to be moved bi-directionally along the axis of the first lead screw;

(d) a second lead screw for engaging the holder; and (e) second drive mechanism for driving the second lead screw, whereby the holder moves bi-directionally along the axis of the first lead screw.

The head positioning apparatus may further include:

(a) a carriage for mounting the head;

(b) first drive mechanism for providing a first lead screw having an axis for rotation and engaging with the carriage, and moving the carriage by rotating the lead screw;

(c) a holder for mounting the first drive mechanism and being possible to be moved bi-directionally along the axis of the first lead screw;

(d) a rack mounted on the holder;

(e) a gear having a gear axis for engaging with the rack; and (f) a second drive mechanism for driving the gear, whereby the holder moves bi-directionally along the axis of the first lead screw.

The head positioning apparatus may further include:

(a) first drive mechanism for providing a lead screw having an axis for rotation and rotating the lead screw;

(b) a carriage for mounting the first drive means and the head;

(c) an engaging unit for engaging with the lead screw; and, (d) second drive mechanism for moving the engaging unit bi-directionally along the axis of the lead screw.

The head positioning apparatus may further include a speed reducing mechanism in either the first drive mechanism or the second drive mechanism.

The head positioning apparatus may further include a detector for detecting a standard position for positioning in either the first drive mechanism or the second drive mechanism.

The gear of the head positioning apparatus may have a bearing providing a square via having two flat planes touching to the gear axis.

In the head positioning apparatus, each of the first and second drive mechanisms may have a stepping motor having a shaft, and either the first drive mechanism or the second drive mechanism moves the carriage coarsely and the other moves the carriage finely with the speed reducing mechanism.

The speed reducing mechanism of the head positioning apparatus may convert the rotation of the shaft to the carriage movement of 3 μm per step.

The speed reducing mechanism of the head positioning apparatus may include an additional gear having a large gear and a small gear coupled together, and a worm gear attached to the shaft for engaging the additional gear.

The additional gear of the head positioning apparatus may have a marker and the apparatus may further include a detector for detecting the marker to recognize a standard position for positioning the head.

The head positioning apparatus may further include a shaft bias mechanism for biasing the shaft of the stepping motor in one direction.

The head positioning apparatus may further include a gear bias mechanism for biasing the additional gear in the same direction as the shaft bias mechanism.

The head positioning apparatus may further include a controller for independently controlling the first drive mechanism and the second drive mechanism.

The controller of the head positioning apparatus may have a table of coarse position and fine position and calculating differentials of the coarse position and the fine position between a previous head position and a new head position based on the table and driving the first and second drive mechanisms independently based on the calculated differentials.

A flexible disk drive may include the head positioning apparatus and media drive mechanism for driving the media wherein the media is flexible disk.

In accordance with another aspect of the invention, a head positioning method for moving and positioning a head mounted on a carriage by a first and second stepping motor each of which has a shaft to rotate may include the steps of:

(a) bi-directionally moving the carriage by the first stepping motor, whose shaft has a cylindrical rack; and (b) bi-directionally moving a cylindrical rack by a gear engaged with the second stepping motor to move the carriage.

The head positioning method may further include the steps of:

(a) bi-directionally moving the carriage by engaging with the shaft of the first stepping motor which is mounted on a holder; and (b) bi-directionally moving the holder by engaging with the shaft of the second stepping motor.

The head positioning apparatus of this invention can position a head finely to the desired position and the invention makes possible to provide a small-sized and easily assembled apparatus, by which smaller hysteresis arises for repeated moving. It is another advantage of the invention that positioning the head can be operated by open loop control because the standard position for moving the head can be detected.

BRIEF DESCRIPTION OF THE DRAWINGS

In the drawing.

FIG. 6 shows an expanded fragmentary view of FIG. 1;

FIG. 10 shows the specification of the gears in relation to Embodiment 1;

FIG. 11 shows the specification of the worm gear in relation to Embodiment 1;

FIG. 12 shows the specification of the helical gear in relation to Embodiment 1;

FIG. 13 shows the load applied by the bias spring for lead screw in relation to Embodiment 1;

FIG. 14 shows the load torque applied to each gear and the fine STM in relation to Embodiment 1;

FIG. 15 shows the angle of the rotation of the worm gear and each gear in relation to Embodiment 1;

FIG. 16 shows moving error by the gear pitch error in relation to Embodiment 1;

FIGS. 17a and 17b show assuming error in relation to Embodiment 1;

FIG. 18 shows moving error by the pitch eccentricity in relation to Embodiment 1;

FIG. 19 shows moving error by the fine STM in relation to Embodiment 1;

FIG. 20 shows the total moving error in relation to Embodiment 1;

FIG. 21 shows dislocation by temperature variation in relation to Embodiment 1;

FIG. 26 shows the specifications of the worm gear in relation to Embodiment 2;

FIG. 27 shows the specifications of the helical gear in relation to Embodiment 2;

DESCRIPTION OF THE PREFERRED EMBODIMENTS

Embodiment 1.

Figure 1:
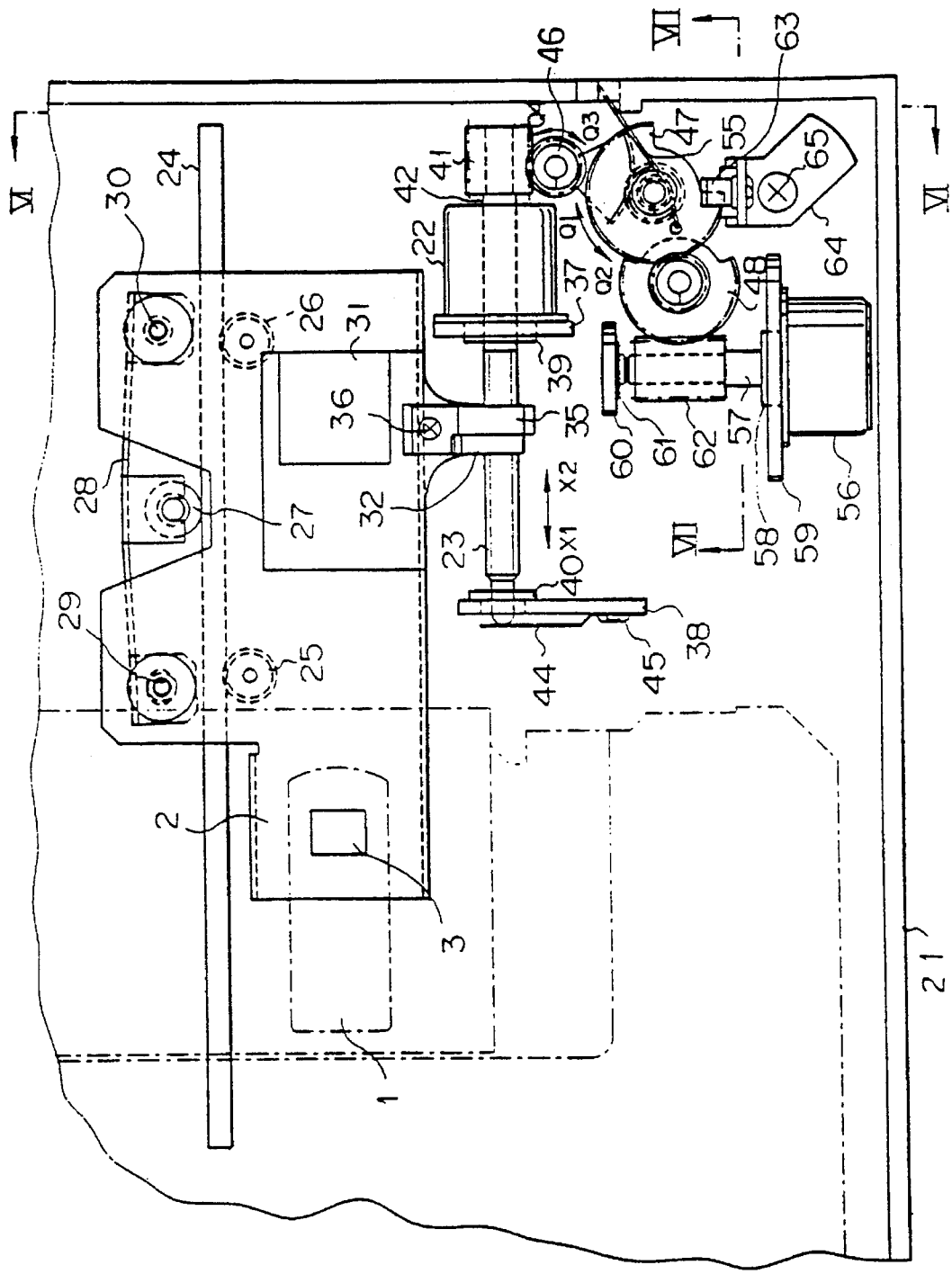
FIG. 1 shows a plan view of the main part in ease of applying this invention to the head moving mechanism of a flexible disk drive unit in relation to Embodiment 1.
Figure 2:
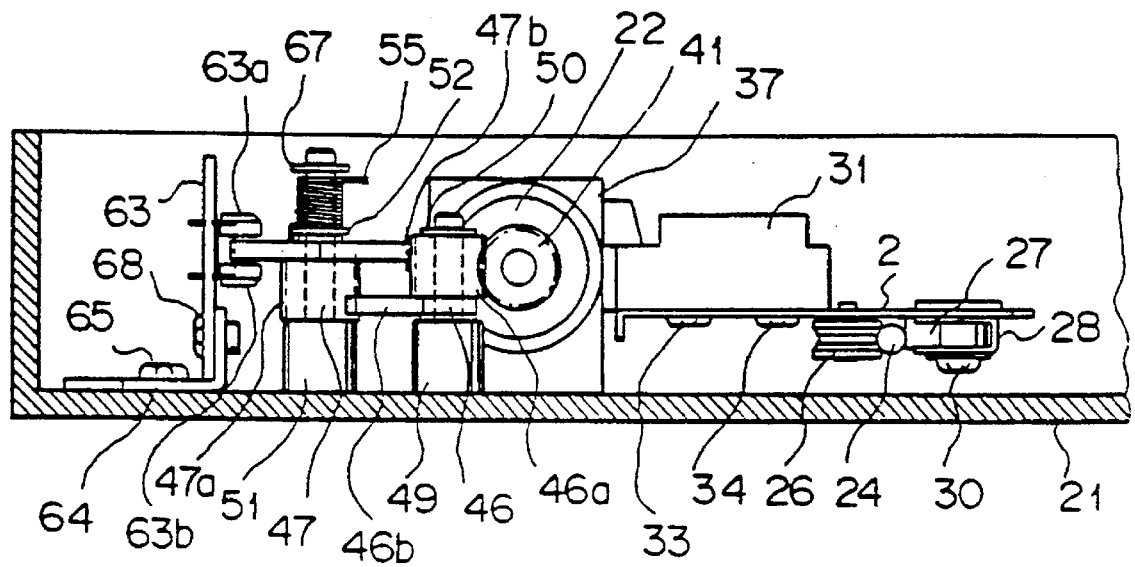
FIG. 2 shows a sectional view of the main part taken on line VI—VI of FIG. 1.
Figure 3:
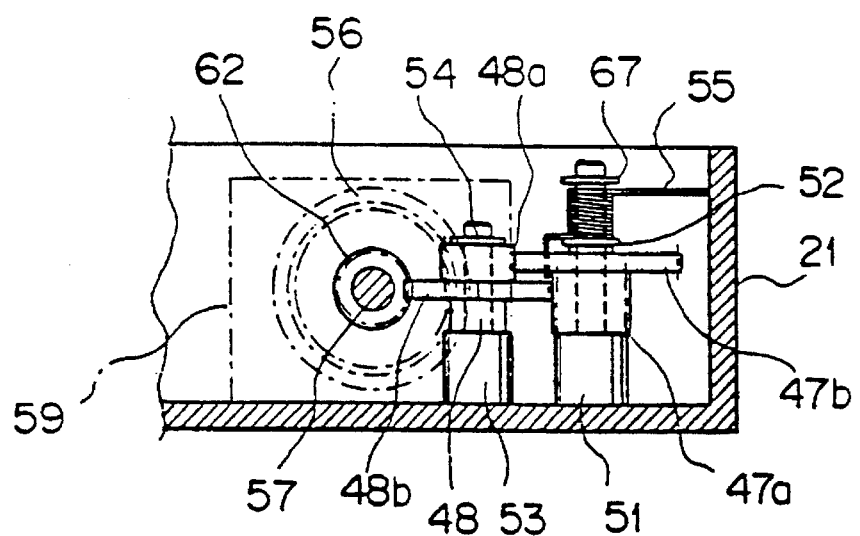
FIG. 3 shows a sectional view of the main part taken on line VII—VII of FIG. 1.
Figure 4:
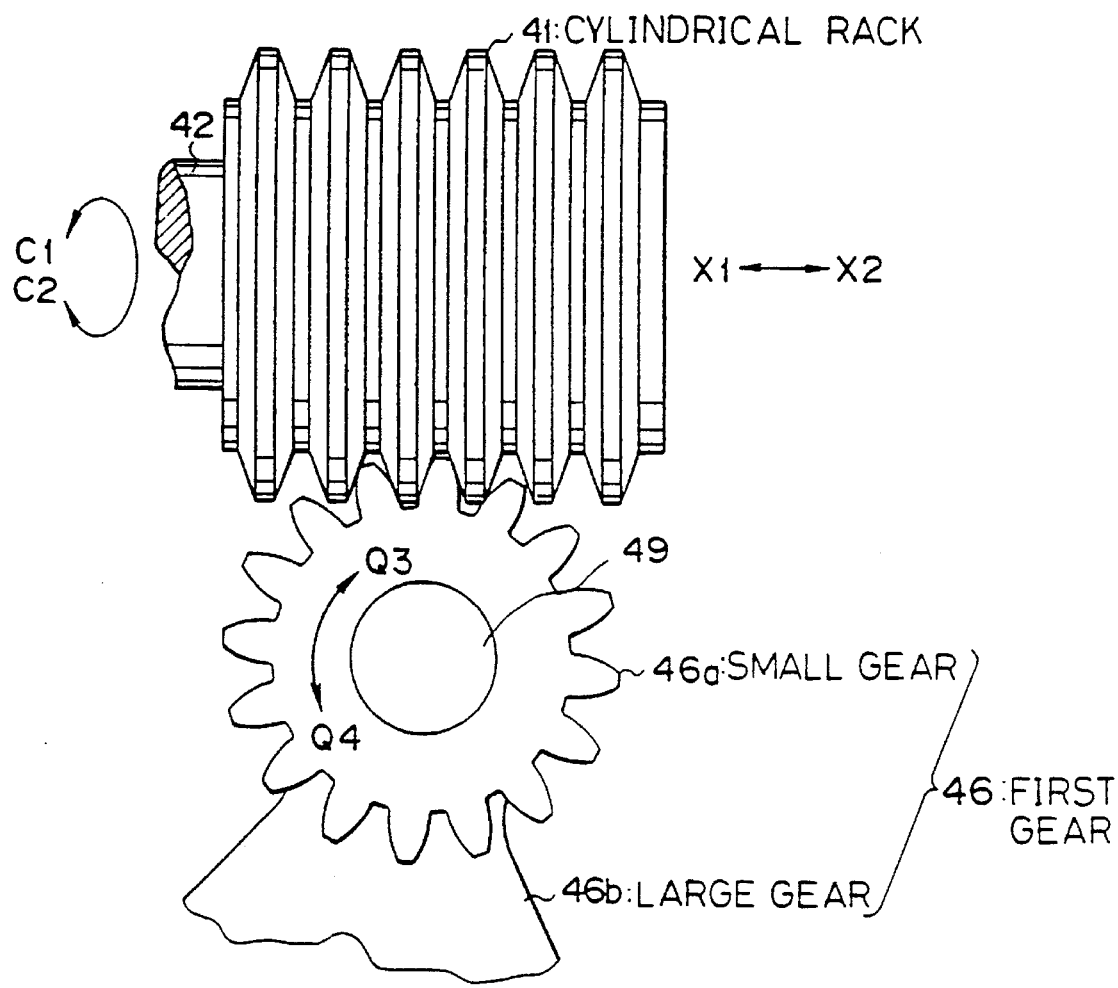
FIG. 4 shows a plan view which shows the condition how the cylindrical, rack and the gear are engaged in relation to Embodiment 1.

The following is an embodiment of this invention. FIG. 1 is a plan view illustrating the application of this invention to the head moving mechanism of a flexible disk drive unit. FIG. 2 is a sectional view of the main part taken on line VI—VI of FIG. 1. FIG. 3 is a sectional view of the main part taken on line VII—VII of FIG. 1. FIG. 4 is a plan view which shows how the cylindrical rack and the gear are engaged.

Figure 5:
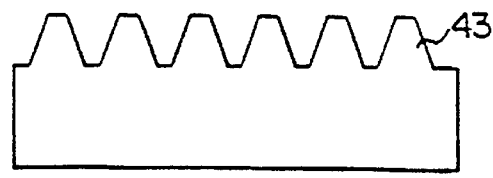
FIG. 5 shows an illustration of the cylindrical rack in relation to Embodiment 1.

FIG. 5 is an illustration of the cylindrical rack. FIG. 6 is an expanded fragmentary view of FIG. 1. The same signs are used for members, which are similar or the same parts with the above conventional arts.

A flexible disk 1 is used as a recording medium. A carriage 2 mounts a head 3. A frame 21 is a frame of the apparatus. A first stepping motor ("stepping motor" is abbreviated to STM hereinafter) 22 has a lead screw 23. A guide rod 24 is fixed to the frame 21 so as to be parallel to the lead screw 23. Roller bearings 25, 26 are provided to the carriage 2, and they have V-shaped groove in their lap sides for contacting to the guide rod 24. A bearing support spring 28 is fixed to the carriage 2 by screws 29, 30. A roller bearing 27 is supported by a bearing support spring 28 and the lap side has a flat surface for contacting to the guide rod 24. The carriage 2 has a needle part 32 engaged with the lead screw 23. A holder 31 has the needle part 32 and is fixed to the carriage 2. A needle pressure spring 35 applies preload against the engaged part of the lead screw 23 with the needle part 32. The needle pressure spring 35 is fixed to the holder 31 by a screw 36.

The roller bearings 25, 26 are applied preload of radial direction by the bearing support spring 28 and the roller bearing 27. The needle part 32 is engaged with the lead screw 23, and the roller bearings 25, 26, 27 contact the guide rod 24. Thus, the carriage 2 is supported by the lead screw 23, the guide rod 24, the needle part 32, and the roller bearings 25, 26, 27 so that the carriage could be moved bi-directionally as shown by arrows X1, X2 by a rotation of the lead screw 23.

The first STM 22 is fixed to a STM stand 37 provided with the frame 21. A bearing 39 is provided with the first STM 22. A bearing supporter 38 provided with the frame 21 has a bearing 40. The lead screw 23 is supported by the bearings 39 and 40 so that the lead screw could slide bi-directionally as shown by arrows X1, X2. In other words, the lead screw 23 is supported so as to rotate and slide.

A cylindrical rack 41 is provided and combined with the extended shaft 42 of the lead screw 23 so that an axis of the cylindrical rack 41 should be the axis of the extended shaft 42. The cylindrical rack 41 has a body, as shown in FIG. 5, which is formed by rotating a rack plate 43 around an axis X—X. A bias spring 44 for lead screw biases the lead screw 23 to the direction shown by arrow X2. The bias spring 44 for the lead screw is fixed to the bearing supporter 38 by a screw 45.

Referring to FIG. 2, 4, the first gear 46 has a small gear 46a engaged with the cylindrical rack 41 and a large gear 46b. The first gear 46 fits to a post 49 provided with the frame 21 and is kept secure to the post 49 by a snap ring 50. The second gear 47 has a small gear 47a engaged with the gear 46b and a large gear 47b. The second gear 47 fits to a post 51 provided with the frame 21 and is kept secure to the post 51 by a snap ring 52. Referring to FIG. 3, the third gear 48 has a small gear 48a engaged with the gear 47b and a helical gear 48b. The third gear 48 fits to a post 53 provided with the frame 21 and is kept secure to the post 53 by a snap ring 54. A bias spring 55 biases the second gear 47 in the direction as shown by arrow Q2 in FIG. 1. The bias spring 55 is engaged with the post 51. One end of the spring is engaged with the gear 47, and the other end contacts to the frame 21. A snap ring 67 is used to keep the bias spring 55 secure to the post 53.

The second STM 56 has a shaft 57 and a bearing 58. A STM stand 59 is a stand of the second STM 56 and is provided with the frame 21. A bearing supporter 60 supports a bearing 61, which supports one end of the shaft 57, and is provided with the frame 21. A worm gear 62 is provided with the shaft 57 and is engaged with the helical gear 48b. A speed reducing mechanism is composed of the worm gear 62, the third gear 48, the second gear 47, and the first gear 46.

The worm gear 62 is rotated by the second STM 56, which causes the third gear 48, the second gear 47, and the first gear 46 to rotate. The small gear 46a of the first gear 46 is engaged with the cylindrical rack 41. The cylindrical rack 41 thus moves bi-directionally, as shown by arrows X1, X2 in FIG. 4. The first gear 46 does not rotate when the lead screw 23 is rotated by the first STM 22 because it is the cylindrical rack 41 that engaged with the gear 46a. In other words, the first STM 22 and the second STM 56 can move the carriage 2 independently and bi-directionally as shown by arrows X1, X2, and these operations do not interfere mutually. The head positioning mechanism is configured as described above. A location of the lead screw 23, in the X1, X2 direction, is decided according to the condition of how the cylindrical rack 41 and the gear 46a are engaged.

The bias spring 44 for lead screw and the bias spring 55 eliminate backlash between the cylindrical rack 41 and the first gear 46, and between the first gear 46 and the second gear 47, and between the second gear 47 and the third gear 48, and between the third gear 48 and the worm gear 62. Each spring is provided to bias to the same direction.

Referring to FIG. 2, a photo interrupter 63 has a light emitter 63a and a receiver 63b. The photo interrupter 63 is fixed to a holder 64 by a screw 68 so that the photo interrupter 63 could insert the gear 47b. The holder 64 is fixed to the frame 21 by a screw 65. The gear 47b has a notch 66 (see FIG. 6) as a marker which can be sensed by the photo interrupter 63. When this notch 66 pivots bi-directionally as shown by arrows Q1, Q2, the photo interrupter 63 is turned on or off, depending on the direction, and the standard position of the gear 47b can be detected. In other words, the photo interrupter 63 can detect the standard position for moving in the X1, X2 direction of the carriage 2 by the second STM 56.

An operation is explained hereinafter. The lead screw 23 is rotated by the first STM 22. Accordingly, the carriage 2 can be moved bi-directionally as shown by X1, X2. Thus the head 3 can be positioned coarsely. On the other hand, the worm gear 62 is rotated by the second STM 56. The cylindrical rack 41 is thus moved bi-directionally as shown by X1, X2, and the lead screw 23 is thereby moved bi-directionally, as shown by arrows X1, X2. Accordingly, the carriage 2 is also moved bi-directionally, as shown by X1, X2, and the head 3 can be positioned finely. This is because the speed of the rotation of the second STM 56 can be reduced by the worm gear 62, the third gear 48, the second gear 47, and the first gear 46.

As described above, positioning the head 3 by the first STM 22 coarsely and positioning the head 3 by the second STM 56 finely can be operated independently and these operations do not interfere mutually.

The reason that the operation interference does not arise is explained in reference to FIG. 4. Even when the cylindrical rack 41 is rotated bi-directionally, as shown by C1, C2, the first gear 46 does not rotate bi-directionally as shown by Q3, Q4. Accordingly, when the cylindrical rack 41 is rotated by a rotation of the first STM 22, the first gear 46 does not rotate and this rotation of the cylindrical rack 41 causes no effect to the second STM 56, which is engaged through the first gear 46, the second gear 47, the third gear 48, and the worm gear 62.

On the other hand, when the first gear 46 is rotated bi-directionally, as shown by Q3, Q4, by the second STM 56, the cylindrical rack 41 is moved bi-directionally as shown by X1, X2. The cylindrical rack can be moved bi-directionally, as shown by X1, X2, even when it rotates bi-directionally as shown by C1, C2. In other words, even when the rack is moving, as shown by X1, X2, and rotating, as shown by C1, C2, simultaneously, they do not influence mutually. Accordingly, even when the first STM 22 rotates, the bi-directional moving as shown by X1, X2 is possible by a rotation of the second STM 56.

As described above, in this embodiment, a rotation of the second STM 56 is converted to the bi-directional moving in X1, X2 direction of the cylindrical rack 41 through a speed reducing mechanism of the worm gear 62, the third gear 48, the second gear 47 and the first gear 46. Accordingly, the fine positioning accuracy of the head 3 is easy attained.

In addition, in this embodiment, backlash between the gears and the cylindrical rack is eliminated by the bias spring 44 for lead screw and the bias spring 55. Hysteresis is thus minimized for the bi-directional moving as shown by X1, X2 of the head 3.

The following is an explanation about eliminating backlash with reference to FIG. 1.

The bias spring 44 biases the lead screw to the direction as shown by X2. The cylindrical rack 41 is biased to the directions shown by X2, too. The first gear 46 is thus biased to the direction as shown by Q3, while the second gear 47 is biased to the direction as shown by Q2. The bias spring 55 biases the second gear 47 to the direction as shown by Q2, too. Accordingly, the bias spring 44 for lead screw and the bias spring 55 for gear bias to the same direction. Backlash can be eliminated by these bias spring forces. Though an illustration is not shown, another bias spring exists inside of the second STM 56, which biases to the direction that is the same as the bias spring 44 and the bias spring 55. The bias spring 44, the bias spring 55 and the internal bias spring of the second STM 56 are provided, so that backlash can be eliminated enough even if the bias force of each spring is weak as compared with the case when only one of these springs is provided. In this way, the head positioning apparatus of this embodiment is composed of several bias springs, which bias to the same direction, so that backlash is eliminated efficiently at each contact point of the gears.

Because fine positioning mechanism is configured fundamentally by a train of gears, it can be fitted to a small-sized apparatus. In addition, it is easy to assemble, compared with the conventional art 1 to which a principle of leverage applies.

Furthermore, in this embodiment, the photo interrupter 63 can detect the standard position for fine positioning of the head 3.

In this way, the head 3 can be positioned to the target position in open loop control from the standard position because the photo interrupter 63 can detect the standard position for fine positioning. In other words, if the control unit, which is not illustrated, has address information about the target position for the first STM 22 and the second STM 56, the head 3 is moved coarsely to the target position by the first STM 22 and is moved finely to the target position by the second STM 56 in open loop control, i.e., a simpler circuit. Because the head 3 can be moved to the target position in open loop control, data can be recorded in the target position even if the flexible disk 1 does not have the address information.

The following is an explanation about a principle that the head 3 can be positioned to the target position using this standard position in open loop control.

When this flexible disk drive unit is turned ON, the notch 66, placed to the gear 47b, is controlled to be located to where the photo interrupter 63 can just detect it. This location is used for the standard position.

FIG. 7 is a drawing, which explains head positioning of a flexible disk drive unit in this embodiment. In FIG. 7 (a), tracks X1, X2 are tracks in case of 135 TPI, tracks Y1, Y2 ... Y6 are tracks in case of 430 TPI. The track pitch is 187.5 μm in case of 135 TPI, and the track pitch of 430 TPI is 59 μm.

The head is positioned for the tracks of 135 TPI by the first STM 22 for coarse moving. In this case, fine positioning by the second STM 56 does not work. On the other hand, in case of head positioning for the tracks of 430 TPI, both coarse positioning by the first STM 22 and fine positioning by the second STM 56 work. For example, in case of positioning to track Y2 as shown in FIG. 7(a), the head needs to be positioned finely to the place, which is SX11 steps away from track X1, and which the second STM 56, simultaneously with the first STM 22 positioning to track X1 can operate.

Figures 7A, 7B:
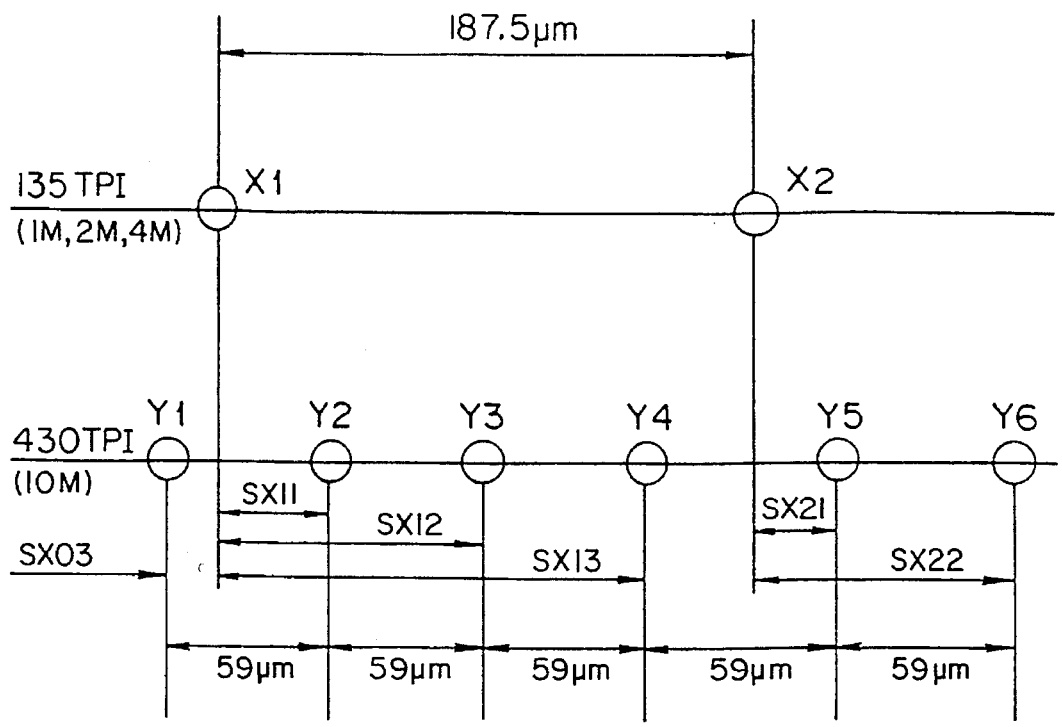
FIGS. 7a and 7b explain the head positioning in this invention.

This is operated by the control unit, not shown, by referring to the table, as shown in FIG. 7(b), which is included in the control unit. The two types of the recording density, 135 TPI and 430 TPI, do not have the fixed relationship that can be found by calculation.

As shown in FIG. 7(b), for example, in case of positioning to track Y2, it is memorized beforehand in the table that the head needs to be moved by SX11 steps with the fine positioning mechanism simultaneously with being positioned to track X1 by the coarse positioning mechanism.

In the same way, in case of positioning to track Y3, it is memorized beforehand that the head needs to be moved by SX12 steps with the fine positioning mechanism simultaneously with being positioned to track X1 by the coarse positioning mechanism.

These SX11, SX12 are the number of steps of the second STM for fine moving. Namely, the number of steps of the second STM 56 for fine moving from the standard position is memorized as a table.

The following is an explanation about the operation in case of moving from track Y2 to track Y6. In case of moving from track Y2 to track Y6, the control unit reads the table and finds that the location of the head needs to be changed from track X1 to track X2. The head is then moved from track X1 to track X2 by the first STM 22. Simultaneously, the head is moved by the difference between SX22 steps and SX11 steps for fine moving by the second STM 56.

In this way, in case of moving between two tracks, the head can be moved with difference from the standard position in fine moving, so that there is a case that the head could be positioned to the desired location without any fine moving.

As described above, coarse moving to the target position by the first STM 22 and fine moving to the target position by the second STM 56 are operated using the table as shown in FIG. 7(b). This is called open loop control.

The following is an example of this embodiment.

A principal model of the head moving mechanism, which has two stepping motors (STM) for coarse moving and fine moving and which is fitted to mass storage FDD (flexible disk drive) for over 10 MB class, is explained hereinafter.

The specifications for the moving mechanism are supposed as follows:

Moving pitch Coarse moving: 1 track in case of 135 TPI(187.5 μm)/2 steps

Fine moving: 3 μm/1 step

Fine moving and coarse moving can be operated independently.

Fine moving range is over ±400 μm.

The moving mechanism can be equipped in an apparatus such as; die thickness less than 25.4 mm, 101.6 mm wide, less than 150 mm deep.

This embodiment is named "cylindrical rack method" and is explained hereinafter.

For clarity sake, the first STM 22 is called "coarse STM", the second STM 56 is called "fine STM", the first gear 46 is called "gear C", the second gear 47 is called "gear B", and the third gear 48 is called "gear A".

As illustrated in FIG. 1 and FIG. 4, the positioning accuracy of the carriage for 135 TPI can be provided by a rotation of the lead screw of the coarse STM. On the other hand, a rotation of the fine STM is converted to the bi-directional moving of the cylindrical rack by the worm gear, gear A, gear B, and gear C. Thus, the carriage is moved 3 μm per step bi-directionally as shown by arrows X1, X2.

Furthermore, as shown in FIG. 4, the carriage is moved finely by the engagement of the cylindrical rack and gear C. Coarse moving by a rotation of the lead screw of the coarse STM and fine moving by a rotation of the lead screw of the fine STM can be operated independently and these operations do not interfere mutually.

Figures 8, 9:
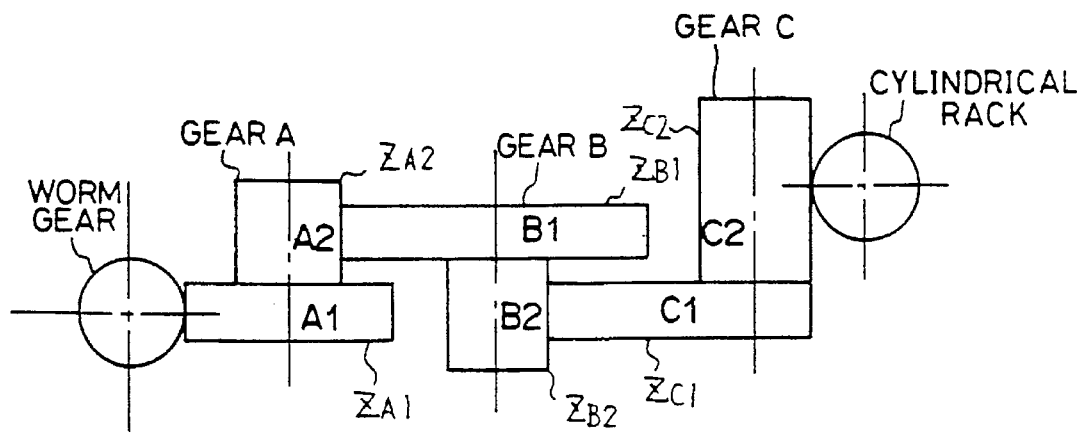
FIG. 8 shows an illustration of the gear train model in relation to Embodiment 1.
FIG. 9 shows the number of teeth of each gear and the moving amount of the cylindrical rack per step of the fine STM in relation to Embodiment 1.

The following is a design of gear train of this embodiment explained in reference to FIG. 8 and FIG. 9. FIG. 8 is an illustration of the gear train model. Gear A has a large gear A1 and a small gear A2. The number of teeth of the large gear A1 is $Z_{A1}$. The number of teeth of the small gear A2 is $Z_{A2}$. In the same way, gear B has a large gear B1 and a small gear B2, and each number of teeth is $Z_{B1}$, $Z_{B2}$. Furthermore, gear C has a large gear C1 and a small gear C2, and each number of teeth is $Z_{C1}$, $Z_{C2}$. Some combinations of numbers of teeth for these gears can be considered as shown from No.1 to No.5 in FIG. 9. In reference to FIG. 9, the moving amount per step in cases of No.3, 4 and 5 are close to 3.0 μm. When a layout and the moving amount of the carriage per step of the fine STM are considered, the combination of numbers of teeth in case of No.3 in FIG. 9 is desirable. Concrete number of teeth of each gear is as follows.

$Z_{A1}=34$ $Z_{A2}=16$ $Z_{B1}=40$ $Z_{B2}=16$ $Z_{C1}=46$ $Z_{C2}=16$

And to get a small-sized apparatus, module m of each gear is $m=0.3$ mm.

[0048]
FIG. 10 shows the specifications of gears.

FIG. 10 shows the specifications of spur gears, each number of teeth is 16, 40 and 46 as described above for case No.3. The pitch diameter, the number of teeth of chordal measurement and the displacement over a given number of teeth is shown in FIG. 10.

FIG. 11 shows the specifications of the worm gear, and FIG. 12 shows the specifications of the helical gear (A1).

FIG. 13 and FIG. 14 are figures for examining the load applied to each gear and the fine STM by the bias spring for lead screw. In these figures, $T_A$, $T_B$, and $T_C$ show torque applied to each gear A, B, C. And $F_W$ shows spring force applied to the worm gear. $T_W$ shows the load torque applied to the fine STM.

The thickness of the bias spring for lead screw is set to $t=0.14\pm0.01$ mm and spring force F is $F_t=0.13$ mm=132.4 gf $F_t=0.14$ mm=165.4 gf $F_t=0.15$ mm=203.4 gf and the torque applied to each unit is as shown in FIG. 14. There is no problem in the torque applied to the fine STM because the load torque $T_W$ is smaller than the motor torque $T_W=5.5$ gfcm.

The following is an explanation about errors in fine moving. The moving error per step of the fine STM caused by the gear pitch error, the pitch circle eccentricity and the load torque $T_W$ applied to the fine STM is calculated hereinafter. FIG. 15 shows the angle of rotation of the worm gear and each gear per step of the fine STM.

First, the moving error by the gear pitch error is calculated. The gears are assumed to be JIS 5 class, the gear pitch error is as follows, according to JISB1702.

| | |
|---|---|
| Gear A1 | 14 μm |
| Gear A2, B2, C2 | 13 μm |
| Gear B1, C1 | 16 μm |
| Worm gear | 14 μm approximately |
| Cylindrical rack | Supposed to be 13 μm. |

The moving error of each gear $e_{S1}$, $e_{S2}$ and $e_{S3}$ caused by these gear pitch errors is calculated approximately as shown in FIG. 16.

The moving error by the pitch circle eccentricity is calculated hereinafter. The worm gear and the cylindrical rack are assumed to have errors caused in the manufacturing process as shown in FIG. 17(a). And the other gears are assumed to have error as shown in FIG. 17(b). In FIG. 17(a), the error per unit angle is;

$f_a=0.06/180=3.33\times10^{-4}$ mm/deg

In the same way, in FIG. 17(b), $f_b=0.04/45=8.89\times10^{-4}$ mm/deg

The moving error of each gear $e_{e1}$, $e_{e2}$, $e_{e3}$, $e_{e4}$, $e_{e5}$, $e_{e6}$ and $e_{e7}$ caused by the above error is as follows.

(1) Worm gear
$e_{e1}$ = {(18 $f_a$ tan20°/34 $m\pi$) × 360/0.529} × 100
  = 4.64%

(2) A 1 gear
$e_{e2}$ = {(0.529 $f_b$ tan20°/34 $m\pi$) × 360/0.529} × 100
  = 0.36%

(3) A 2 gear
$e_{e3}$ = {(0.529 $f_b$ tan20°/40 $m\pi$) × 360/0.212} × 100
  = 0.77%

(4) B 1 gear
$e_{e4}$ = {(0.212 $f_b$ tan20°/40 $m\pi$) × 360/0.212} × 100
  = 0.31%

(5) B 2 gear
$e_{e5}$ = {(0.212 $f_b$ tan20°/40 $m\pi$) × 360/7.366 × 10$^{-2}$} × 100 = 0.77%

(6) C 1 gear
$e_{e6}$ = {(7.366 × 10$^{-2}$ $f_b$ tan20°/46 $m\pi$) × 360/ 7.366 × 10$^{-2}$} × 100 = 0.27%

(7) C 2 gear
$e_{e7}$ = (7.366 × 10$^{-2}$ $f_b$ tan20°/3.09 × 10$^{-3}$) × 100
  = 0.77%

And the error by the pitch eccentricity is as shown in FIG. 18.

The following is the calculation for moving error by the fine STM.

FIG. 19 shows the moving error by the fine STM, the error by the motor itself, and the error by the load torque calculated separately.

As explained above, the moving error by three factors—the gear pitch error, the pitch circle eccentricity and the fine STM—is shown in FIG. 20.

Head positioning error in the fine positioning mechanism caused by temperature variations is calculated hereinafter. Head positioning error by temperature variation is calculated supposing that backlash occurred by temperature variation. (The standard position is positioning point of the fine STM.)

The calculation of head positioning error caused by the fine positioning mechanism by this temperature variation is shown in FIG. 21.

According to this calculation, the following is an example calculated in case of variation of temperature ($\Delta t$)=10° C.

$\delta_1 = 3.672 \times 10^{-3}$ mm $\delta_2 = 0.144 \times 10^{-3}$ mm $\delta_3 = 0.348 \times 10^{-3}$ mm $\delta_4 = 1.083 \times 10^{-3}$ mm $\delta_5 = 1.081 \times 10^{-3}$ mm $\delta = \delta_1 + \delta_2 + \delta_3 + \delta_4 + \delta_5 = 4.370 \times 10^{-3}$ mm Normal direction of dislocation is the peripheral direction.

Figure 22:
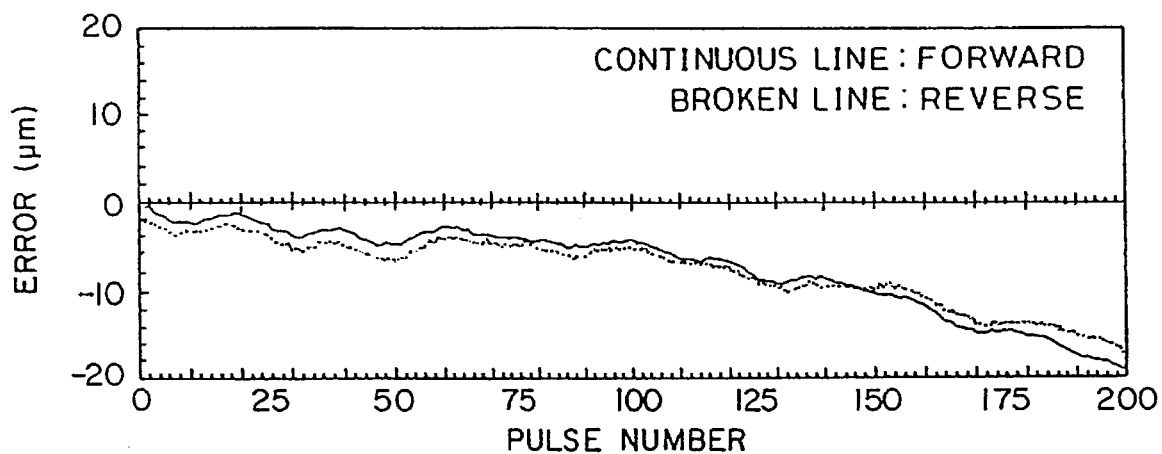
FIGS. 22a and 22b shows the cumulative moving error and the moving error per step in relation to Embodiment 1.
Figure 22:
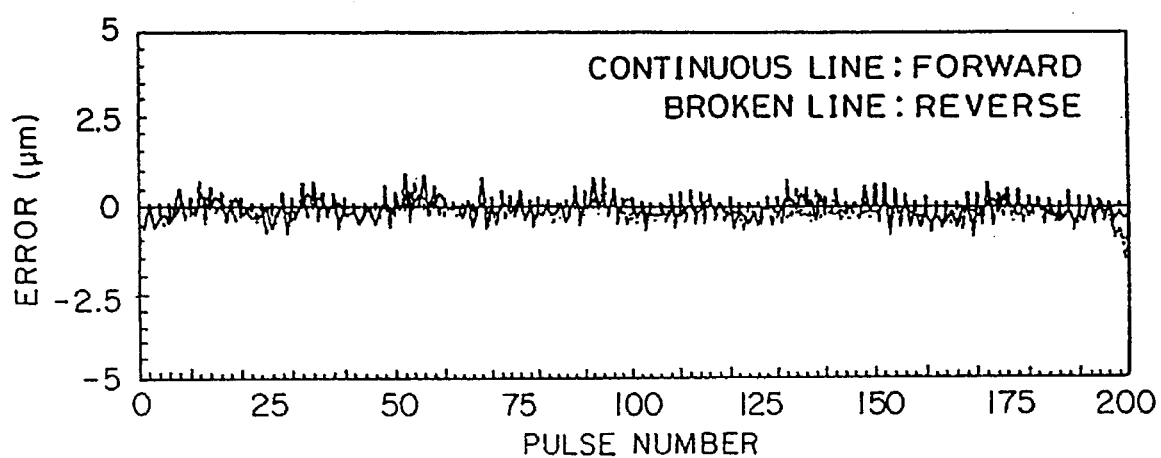

Experimental data measured in the above embodiment is shown in FIG. 22. FIG. 22 shows the cumulative moving error and the moving error per step when the head is moved finely and bi-directionally by the cylindrical rack method in 200 steps ("Overs" and "shorts" for desired moving amount 3 μm).

In FIG. 22, the horizontal axis shows step number (pulse number), and the vertical axis shows moving error.

FIG. 22(a) shows cumulative moving error up to 200 steps. FIG. 22(b) shows moving error per step. In FIG. 22(a), FIG. 22(b), the continuous lines show moving error in case of forward moving the carriage and the broken lines show in case of reverse moving. Embodiment 2.

Figure 23:
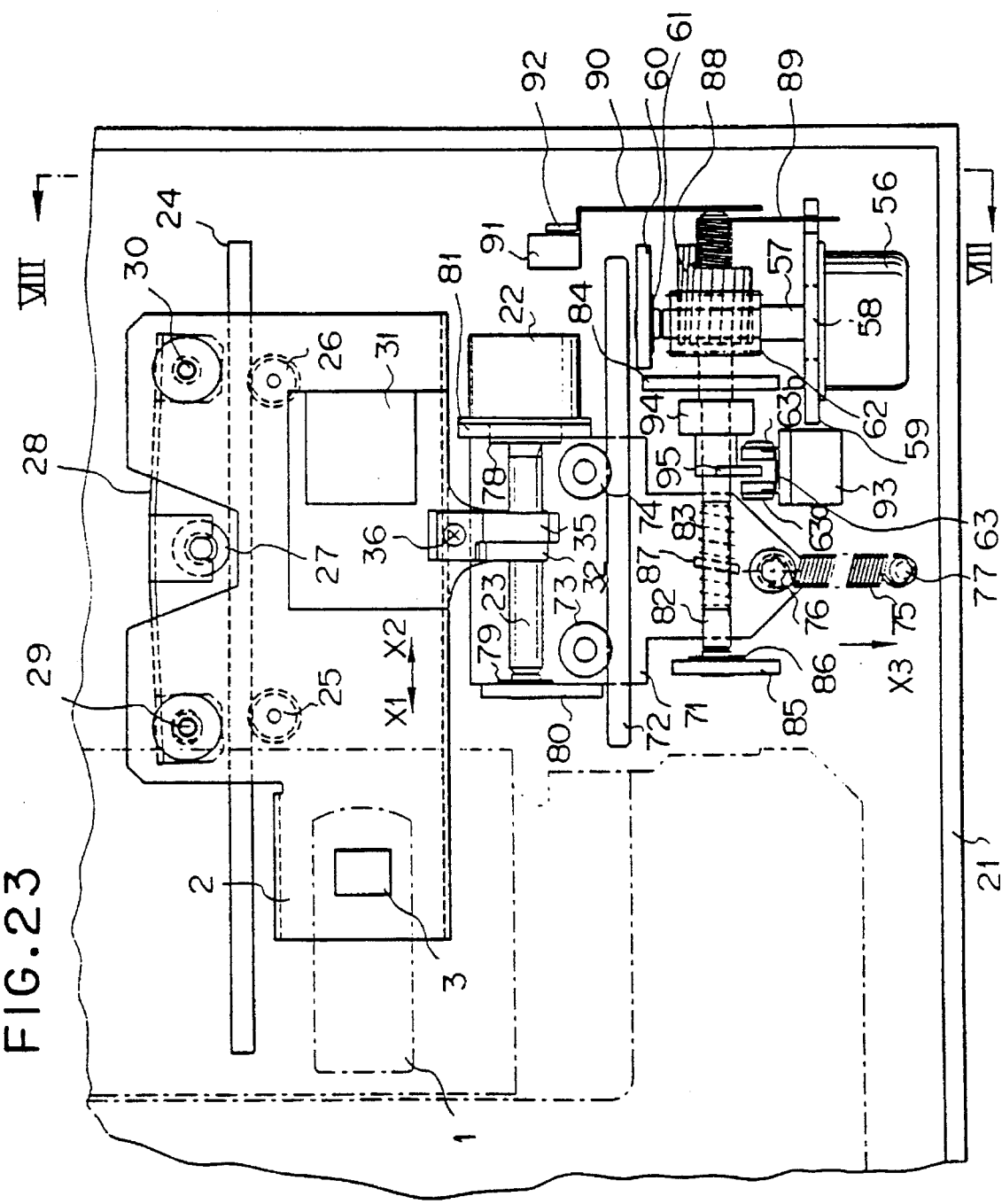
FIG. 23 shows a plan view of the main part of the head positioning mechanism in case that this invention is applied to the flexible disk drive unit in relation to Embodiment 2.

In the above embodiment 1, the lead screw 23 engaged with the carriage 2 is moved directly by the cylindrical rack 41 and the gear 46a. The same effect to the above embodiment can be provided when the first lead screw 23 is engaged with the carriage 2, the first STM 22 has the first lead screw 23, and the STM holder 71, mounting the first STM 22, is moved by the second STM 56 as shown in FIG. 23.

Figure 24:
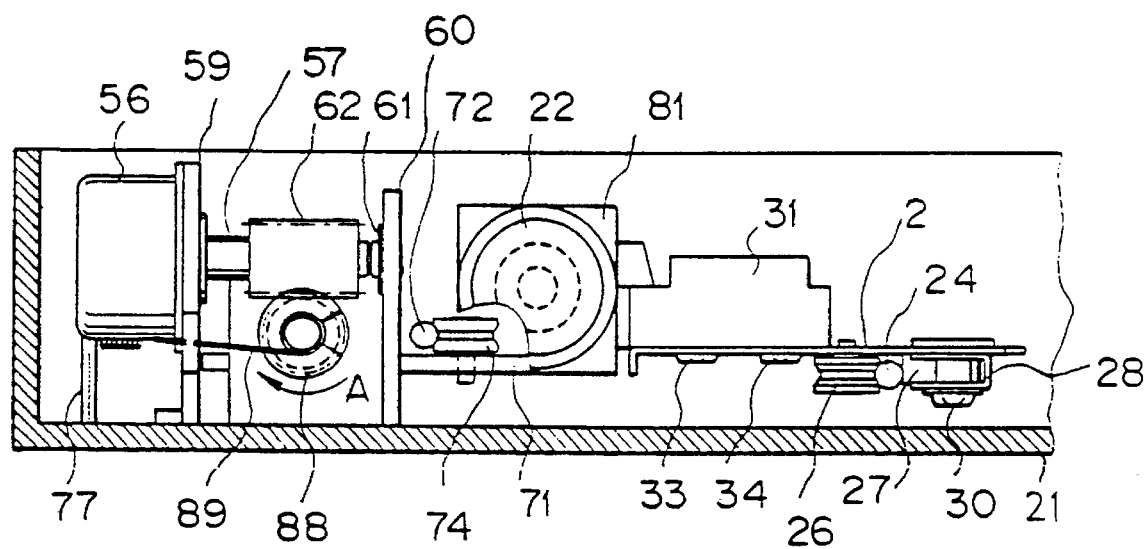
FIG. 24 shows a sectional drawing of the main part taken on line VIII—VIII of FIG. 23.
Figure 25:
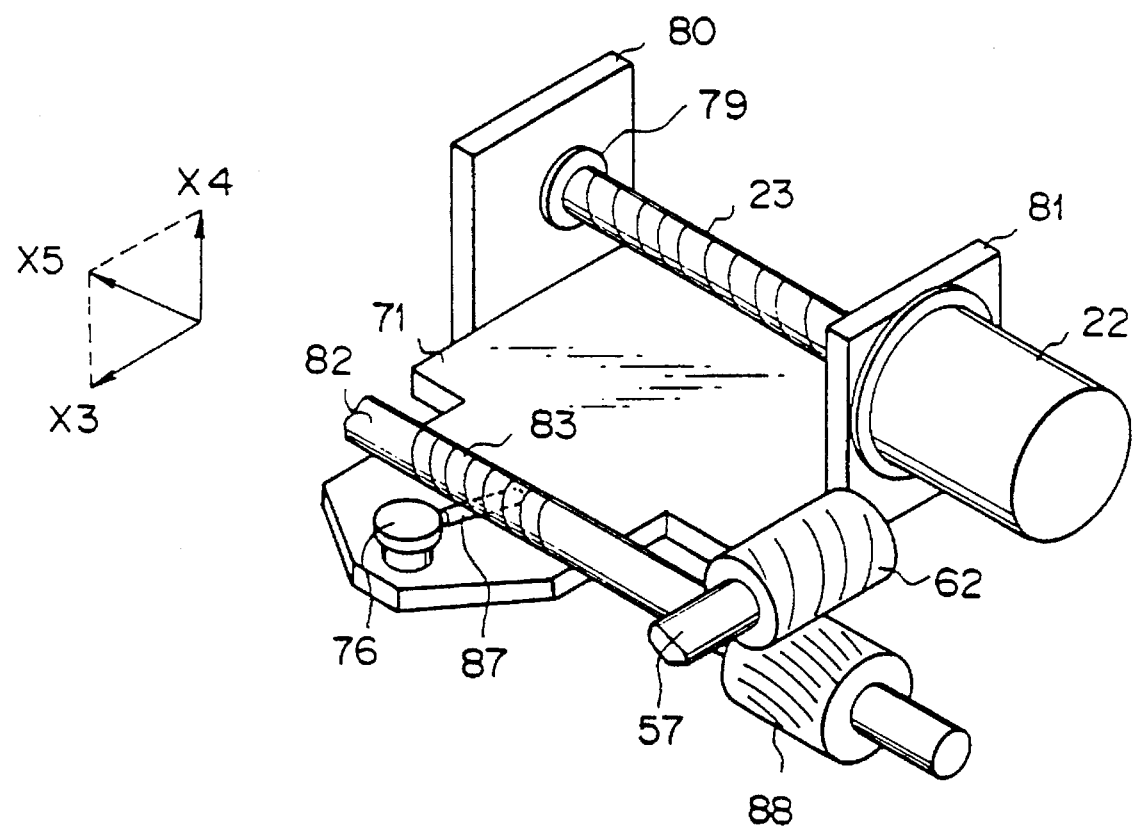
FIG. 25 shows a simplified perspective view of the main part of FIG. 23.
Figure 28:
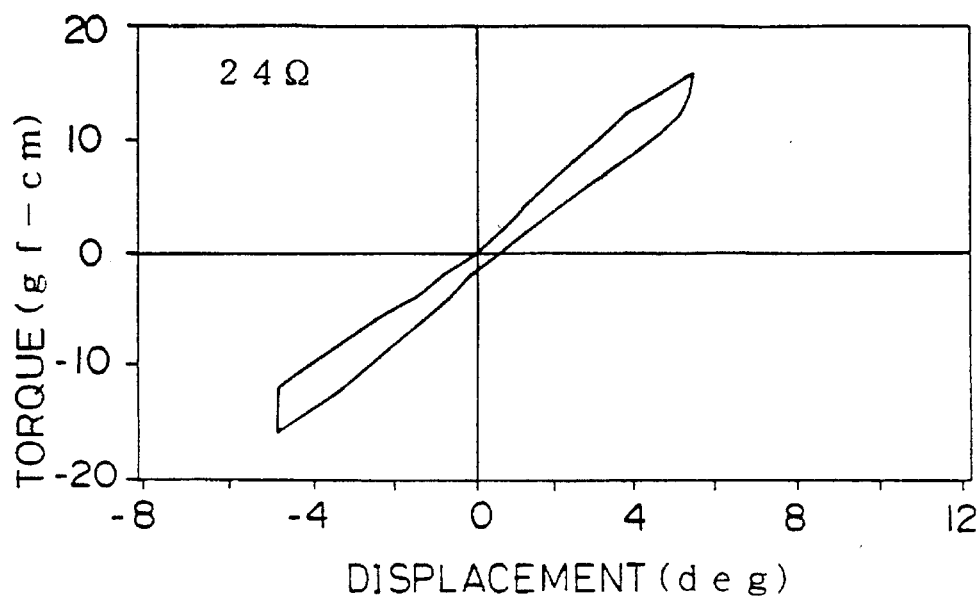
FIG. 28 shows θ-T characteristics of STM in relation to Embodiment 2.
Figure 29:
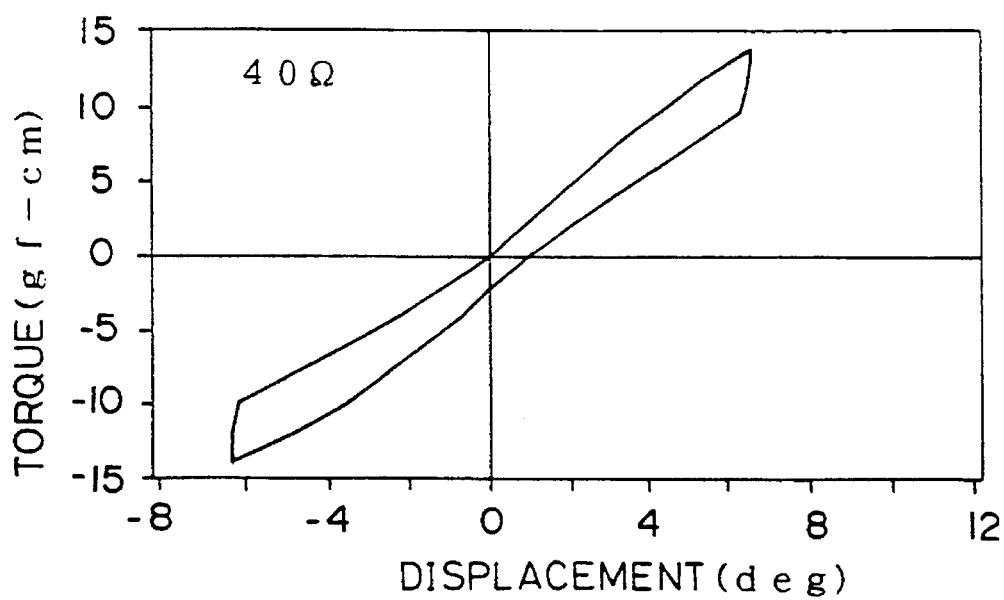
FIG. 29 shows θ-T characteristics of STM in relation to Embodiment 2.
Figure 30:
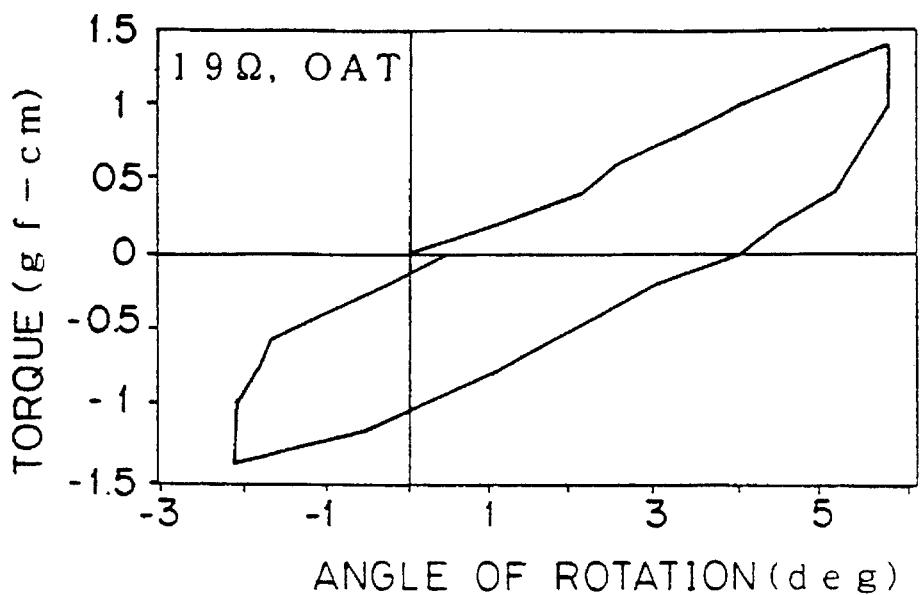
FIG. 30 shows θ-T characteristics of STM in relation to Embodiment 2.
Figure 31:
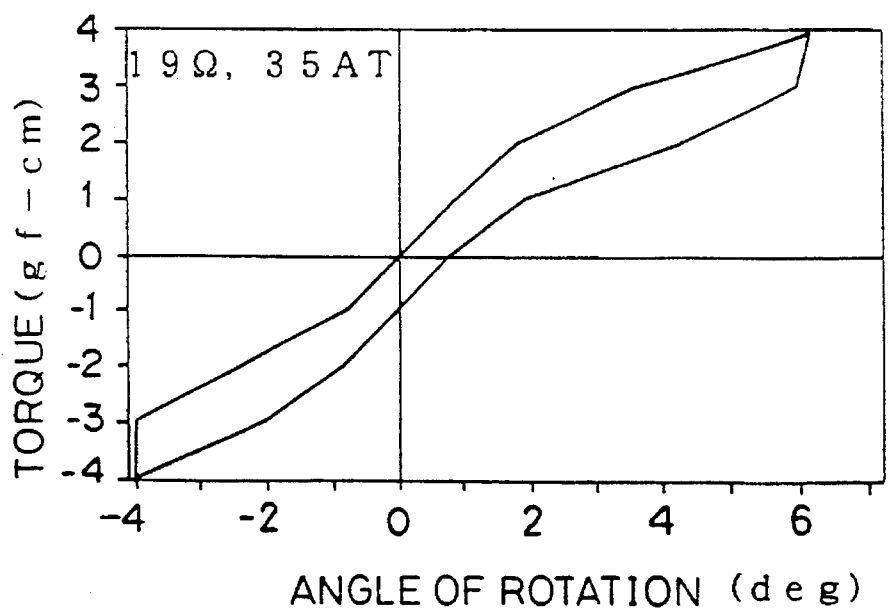
FIG. 31 shows θ-T characteristics of STM in relation to Embodiment 2.
Figure 32:
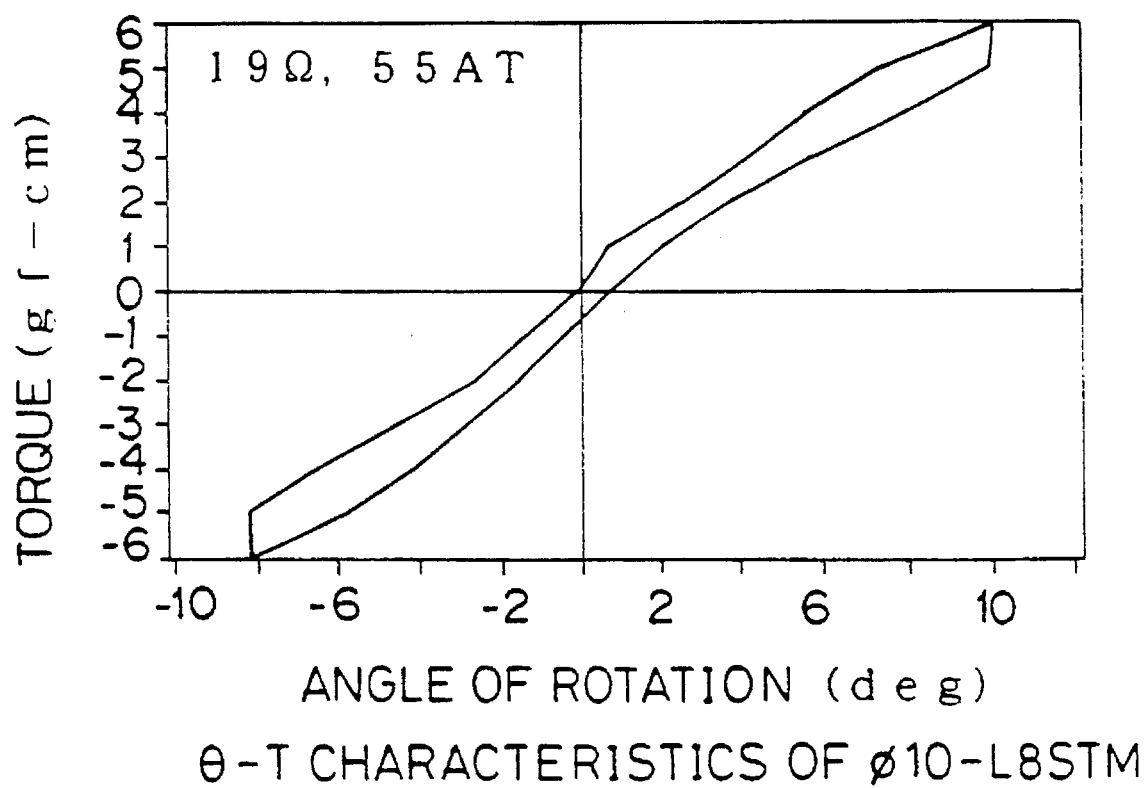
FIG. 32 shows θ-T characteristics of STM in relation to Embodiment 2.

This embodiment is explained hereinafter. FIG. 28 is a plan view of the main part of the head positioning mechanism being applied to a flexible disk drive unit. FIG. 24 is a sectional drawing of the main part taken on line VIII—VIII of FIG. 23. FIG. 25 is a simplified perspective view of the main part of FIG. 28. The same signs are used for the same or similar parts to the above embodiment and they are not explained here, for clarity sake.

In this embodiment, the lead screw 23 is called "the first lead screw", and the guide rod 24 is called "the first guide rod" hereinafter.

Different aspects from Embodiment 1 are explained hereinafter in reference to FIGS. 23–25.

A STM holder 71 is provided in this embodiment. The second guide rod 72 is fixed to the frame 21 so that the second guide rod could be parallel to the first lead screw 23. Roller bearings 73, 74 are provided with the STM holder 71 and they have a V-shaped groove in their lap sides for contacting to the second guide rod 72. A preload spring 75 applies preload against each contact of the second guide rod 72 and the roller bearings 73, 74 to the direction as shown by X3. One end of the preload spring 75 is engaged with an engaging part 76 of the STM holder 71 and the other end is engaged with an engaging part 77 of the frame 21. A bearing 78 holds the first lead screw 23 of the first STM 22. A bearing 79 is provided with a bearing supporter 80 of the STM holder 71 and supports an end of the first lead screw 23. A STM stand 81 is provided with the STM holder 71 and holds the first STM 22.

A second lead screw 83 is provided in the center part of a driving shaft 82 and a supporter 84, provided with the frame 21, holds the shaft 82. A bearing supporter 85 is provided with the frame 21, and the supporter 85 has a bearing 86. The bearing 86 supports an end of the driving shaft 82. A second needle 87 is provided with the STM holder 71 and is engaged with the second lead screw 83. A helical gear 88 is provided with the drive shaft 82.

The second STM 56 has the worm gear 62 engaged with the helical gear 88. A bearing 61, which is a pivot bearing, holds an end of the axis of the second STM 56. A backlash-eliminating spring 89 eliminates backlash of the helical gear 88 and the worm gear 62. One end of the backlash-eliminating spring 89 is engaged with the helical gear 88 and the other end is supported by STM stand 59. A bias spring 90 for driving shaft biases the driving shaft 82 towards the bearing 86. The bias spring 90 for driving shaft is fixed to a stand 91 provided with the frame 21 by a screw 92. The preload spring 75 also applies preload against the engagement of the second lead screw 83 and the second needle 87. Namely, the preload spring 75 is provided so as to apply preload to the direction as shown by X5 so that the spring 75 could apply preload to both direction as shown by X3 and X4 in FIG. 25.

The carriage 2 is supported by the needle part 32 engaged with the first lead screw 23 and the roller bearings 25, 26 and 27 contacted to the guide rod 24. Accordingly, the carriage 2 is supported so as to move bi-directionally, as shown by arrows X1, X2, by the rotation of the first lead screw 23. On the other hand, the STM holder 71 is supported by the roller bearings 73, 74 contacted to the second guide rod 72 and the second needle 87 engaged with the second lead screw 83 and the preload spring 75. Accordingly, the STM holder 71 is supported so as to move bi-directionally as shown by arrows X1, X2 by the rotation of the driving shaft 82. In other words, the first lead screw 23 moves bi-directionally as shown by X1, X2 by the bi-directional moving of the STM holder 71 as shown by X1, X2, and the carriage 2 also moves in both X1, X2 direction.

A stand 93 is provided with the frame 21. The photo interrupter 63, which has a light emitter 63a and a receiver 63b, is provided with the stand 93. A douser holder 94 is provided with the driving shaft 82. The douser holder 94 has a douser 95, which is located between the light emitter 63a and the receiver 63b of the photo interrupter 63. This douser 95 turns the photo interrupter 63 on, off with the rotation of the driving shaft 82, and the photo interrupter 68 can detect the standard position of the driving shaft 82. In other words, the standard position of X1, X2 direction of the carriage 2 moved by the rotation of the driving shaft 82 can be detected.

The following is an operation explained. The first STM 22 rotates the first lead screw 23. This causes the carriage 2 move bi-directionally, as shown by X1, X2, and the head 3 can be positioned coarsely. On the other hand, the second STM 56 rotates the worm gear 62. This causes the helical gear 88 to rotate and causes the driving shaft 82, which is provided and combined with the axis of the helical gear, to rotate. Accordingly, the STM holder 71 moves bi-directionally, as shown by arrows X1, X2. With this movement, the carriage 2 is moved bi-directionally, as shown by arrows X1, X2, and the head 3 is positioned finely. This is because the rotation of the second STM 56 is converted to the bi-directional moving of the STM holder 71 by the worm gear 62, the helical gear 88, and the second lead screw 83.

Both the first lead screw 23 and the first STM 22 are mounted on the STM holder 71, driven by the second STM 56, so that coarse positioning and fine positioning of the head 3 can be operated independently and these operations do not interfere mutually. Furthermore, the standard position for positioning the head 3 can be detected by the photo interrupter 63.

As described above, the rotation of the second STM 56 is converted to the bi-directional moving of the STM holder 71 by the worm gear 62, the helical gear 88, and the second lead screw 83. Thus desired fine moving accuracy of the head 3 is easy to attain.

Each backlash of the worm gear 62 and the helical gear 88 is eliminated by the backlash-eliminating spring 89. Hysteresis is thus hard to arise for moving the head 3 in X1, X2 direction.

The standard position for fine positioning can be detected by the photo interrupter 63. The head 3 is thus moved coarsely to the target position by the first STM 22 and can be moved finely to the target position by the second STM 56 by open loop control, when the control unit, not shown, has address information of the first STM 22 and the second STM 56 for the target position. Thus, the circuit can be simplified. Because the head 3 can be moved to the desired position by open loop control, it is possible to write on the desired position of the flexible disk 1 even if the location information is not recorded on the flexible disk 1.

The following is a concrete example of this embodiment. This embodiment is called "lead screw method" and explained hereinafter.

Also in this embodiment, the first STM 22 is called "the coarse STM", the second STM 56 is called "the fine STM", the first lead screw 23 is called "the coarse lead screw", and the second lead screw 83 is called "the fine lead Screw".

For reading/writing (R/W) from/on a lower density disk (1/2/4 MB), the coarse lead screw is rotated by the coarse STM and the carriage, engaged with this lead screw, is moved along the disk radius. This is the same operation with the conventional FDD.

For R/W in case of higher density disk (more than 10 MB), the carriage is needed to be moved 3 μm per step. In this method, the coarse STM, engaged with the carriage, is moved 3 μm per step, thereby moving the carriage. The STM holder 71, supporting the coarse STM, is guided along the radius of the disk by the roller bearings 73, 74 and guide rod 72. The needle part 87, provided with the holder, is engaged with the fine lead screw. The STM holder 71 is thus moved by the rotation of the fine lead screw. The speed of the rotation of the fine STM is reduced by the worm gear and the helical gear, and the speed-reduced rotation is transmitted to the fine lead screw.

The following is a design example of the fine moving mechanism. First, the speed reduction ratio and a design of the lead screw are explained. For getting a small-sized apparatus, module m of the worm gear and the helical gear is $m=0.3$ mm.

When speed reduction ratio G is large (that is, when the number of teeth Z of the helical gear is large), a lead screw having wide pitch can be used for the fine lead screw. But providing a thinner apparatus is difficult when speed reduction ratio is large because the worm gear and the helical gear are piled up in the die thickness direction. Then the number of teeth Z of the helical gear is $Z=20$ ($=G$).

Furthermore, when the fine STM rotates 18°/step, the fine lead screw rotates $18/20=0.9°$.

For moving the head 3 μm/step by this rotation, the pitch P of the lead screw is $P=0.003\times360/0.9=1.2$ (mm).

The outside diameter of the lead screw is 2.5. Assuming a needle for the fine moving mechanism has the same size with the needle of the needle part 32 in the coarse moving mechanism, pitch diameter $D_P$ is $D_P=2.1$. The lead angle β is calculated from $\tan\beta=P/(\tau D_P)$ $\beta=\tan^{-1}\{1.2/(\pi\times2.1)\}=10.309°=10°18'32"$.

The following is a design of the worm gear. Reference pitch $d_1$ is $d_1=5$.

When the reference pitch is small, the deddendum diameter becomes small. Thus the strength of the worm gear is not enough for press fitting the axis of the fine STM. FIG. 26 shows the specifications of the worm gear, and FIG. 27 shows the specifications of the helical gear.

The following is an explanation about the torque needed by the backlash-eliminating spring. The backlash-eliminating spring biases the helical gear 88, the axis of which is combined with the fine lead screw, to the direction as shown by arrow A, in FIG. 24. Thus, the backlash between the worm gear and the helical gear is eliminated. This bias direction is the same as direction that the axis of the fine STM presses the pivot bearing. The torque experienced by this spring needs to be larger than frictional load $T_L$, applied to the fine lead screw. $T_L$ is composed of the load $T_N$, occurred by pressing the second needle 87, and the load $T_B$, occurred in the bearing parts 58, 61. The force of pressing the needle is assumed to be 50 g, and the coefficient of friction μ is assumed to be 0.2. The torque $T_N$, occurred by pressing the second needle 87, is $T_N=50\times0.2\times0.21/2=1.05$ (gfcm).

0.21/2 is a pitch radius. Assuming $T_B=T_N$, $T_L=T_N+T_B=2\ T_N$ (gfcm)=2.1

Accordingly, the backlash-eliminating spring must always experience larger torque than 2.1(gfcm).

The amount of rotation $\theta_T$ of the helical gear is calculated as follows.

Fine moving range=±400 μm

Fine moving amount=3 μm/0.9°

∴$\theta_T=(\pm400/3)\times0.9=\pm120$ (deg)

Accordingly, the spring always needs to occur the above-mentioned torque in the range of $\theta_T=\pm120$ (deg). For example, a spring of T=12.1 ±6.6 (gfcm) in the range of $\theta_T=220°\pm120°$ can be available from the market.

The torque $T_S$ needed by the fine STM is calculated hereinafter.

$T_S=P\times\tan(v+\rho)\times\gamma_1$

P: the load of the axial direction applied to the worm gear
v: the lead angle of the worm gear=3.440°
ρ: $\tan^{-1} \mu$=11.3° (assuming μ=0.2)
$\gamma_1$: the pitch radius of the worm gear =0.25 (cm)

And when the center value of the torque occurred by the backlash-eliminating spring is 12.1(gfcm) and the length of the end of the spring is =0.3 cm, $$P=12.1/0.3=40.3 \text{ (g)}.$$

$$\therefore T_S = 40.3 \times \tan(3.440° + 11.3°) \times 0.25$$
$$= 2.65 \text{ (gfcm)}$$

The moving error of the fine moving mechanism is explained hereinafter by describing how much each factor influences the desired fine moving amount. The factors that influence the moving accuracy of the fine moving mechanism are as follows.

(1) Rotation accuracy of the fine STM
 a. Rotation accuracy of STM (Outside friction= zero 0)
 b. Dispersion of positioning by the outside friction
(2) Swing and pitch error of the worm gear
(3) Swing and pitch error of the helical gear
(4) Pitch accuracy of the fine lead screw Temperature variation is not considered here.

The above factors (1)~(4) that influence the accuracy of the fine moving mechanism are explained hereinafter.

(1) Rotation accuracy of the fine STM
 (a) Error $e_{11}$ by STM

Positioning accuracy of normal STM with a lead screw used for the FDD is assumed to be $$0.1875 \pm 0.01 (/\text{track}).$$

Cumulative pitch error of the lead screw of the above STM is assumed to be less than 0.008. Pitch error per track is assumed to be 0.005. Rotation error of STM per track becomes (simply summed up)

$$\pm(0.01-0.005)=\pm0.005.$$

$$\therefore e_{11}=\pm 0.005/0.1875=\pm 2.67\%$$

(b) Dispersion of positioning $e_{12}$ by the outside friction

θ-T characteristics of STM (φ10–15, L8, 19~40Ω) is shown in FIG. 28~32. From these figures, θ-T characteristics of STM of φ12, L8, 15Ω is estimated to be 10 gfcm/6°. Outside friction applied to STM is assumed to be equal to the above-mentioned torque needed by STM $T_S$=2.65 (gfcm), static dispersion of positioning (Kinetic energy of a rotating part is ignored) becomes $$\pm 6/10 \times 2.65 = \pm 1.59°.$$

The dispersion of positioning $e_{12}$ by the outside friction for 1 step =18° becomes $$e_{12}=\pm 1.59/18=\pm 8.83\%.$$

Figure 33:
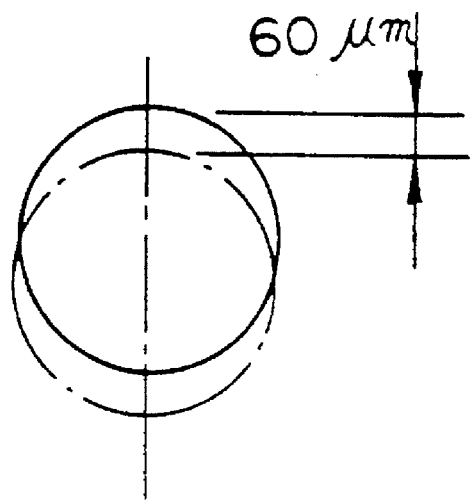
FIG. 33 shows assuming error by the swing of the worm gear in relation to Embodiment 2.

(2) Error by the worm gear
 (a) Error $e_{21}$ by swing of the worm gear (referring to FIG. 33)

Swing of the worm gear is assumed to be 60 $\mu m^{p-p}$ at 1 time per round.

$$60 \text{ μm}/180° = 60 \text{ μm}/10 \text{ step} = 6 \text{ μm/step}$$

This is converted to the rotation θ of the helical gear $$\theta = (0.006 \times \tan 20°/6.011 \pi) \times 360° = 0.042° \text{ (/step)}$$

The denominator (6.011 π) is a pitch circle lap of the helical gear. A rotation of the lead screw 83 is 0.9°/step. Thus the error $e_{21}$ by swing of the worm gear is $$e_{21}=0.042/0.9=4.63\%$$

Figure 34:
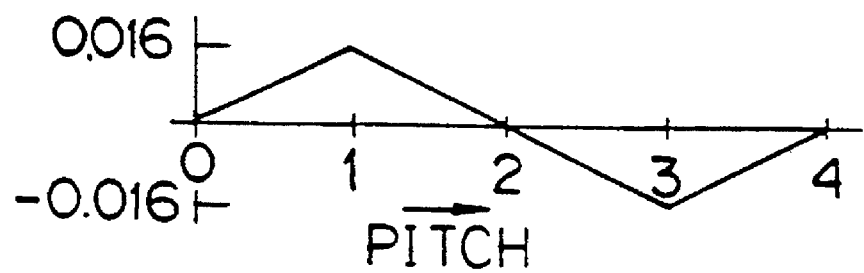
FIG. 34 shows error by the error of the worm gear pitch in relation to Embodiment 2.

(b) Error $e_{22}$ by error of the worm gear pitch (referring to FIG. 34)

The pitch error of the worm gear is 0.016 (JIS 5 class, m=1~1.6). This error is assumed to cumulate simply in 1 pitch=20 steps, and the cumulative error is converted to the rotation θ of the helical gear, $$\theta = \{(0.016/20)/6.011 \pi\} \times 360° = 0.015° \text{ (/step)}$$

$$\therefore e_{22}=0.015/0.9=1.69\%$$

Figures 35, 36:
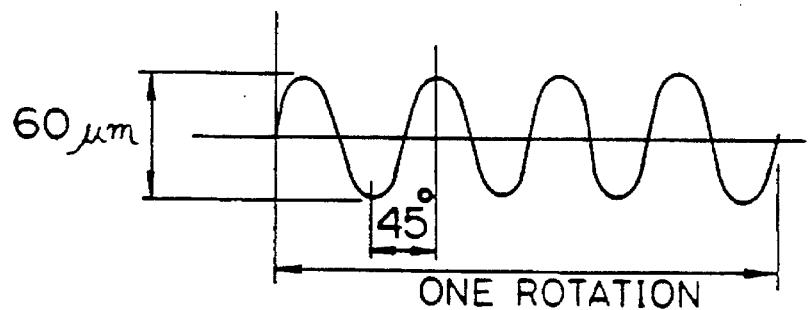
FIG. 35 shows error by swing of the helical gear in relation to Embodiment 2.
FIG. 36 shows total error in relation to Embodiment 2.

(3) Error by the helical gear
 (a) Error $e_{31}$ by swing of the helical gear (referring to FIG. 35). Swing is assumed to be 60 $\mu m^{p-p}$ at 4 times per round.

$$e_{31} = \text{A circumferential direction gap of}$$
$$\text{positioning during the helical gear rotates } 45°/\text{A}$$
$$\text{pitch circle lap length for } 45°$$
$$= (0.06 \times \tan 20°)/\{6.011 \pi \times (45/360)\} = 0.93\%$$

(b) Error $e_{32}$ by pitch error of the helical gear

Pitch error is assumed to be 0.016 (in the same way with the worm gear). Thus error for 1 pitch=mπ (m=0.3) becomes $$e_{32}=0.016/0.3\pi=1.07\%.$$

(4) Pitch accuracy of the lead screw $e_4$

Pitch accuracy of the lead screw $e_4$ is assumed to be the same ratio with the above pitch error per track in (1) (a). Thus $$e_4=0.005/0.1875 = 2.67\%.$$

Though the pitch of the fine lead screw is 1.2 mm, ratio of error is assumed to be equal to the case of 1.875 mm.

Moving error is calculated from above $e_{11}$~$e_4$ and shown in FIG. 36.

Figure 37A:
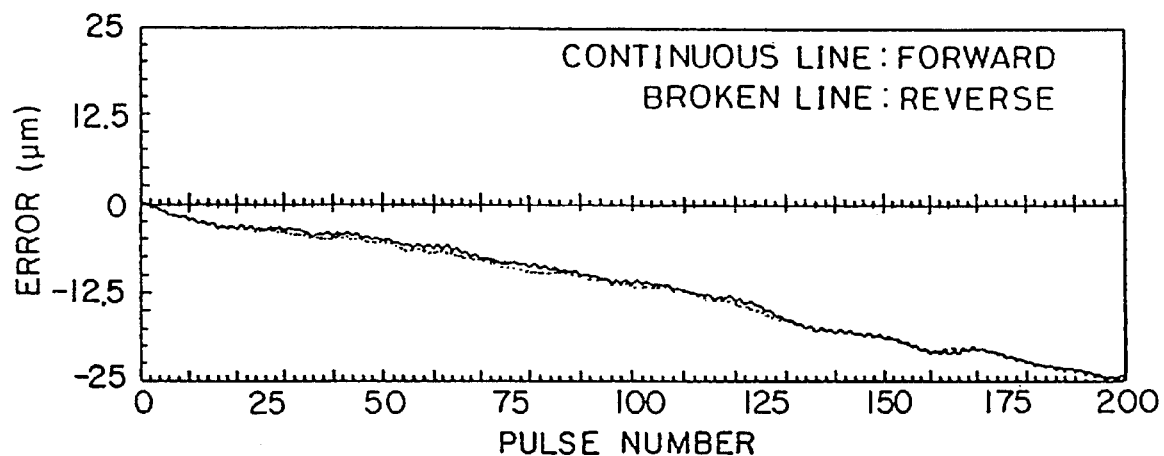
FIGS. 37a and 37b show cumulative moving error and moving error per step in relation to Embodiment 2.
Figure 37B:
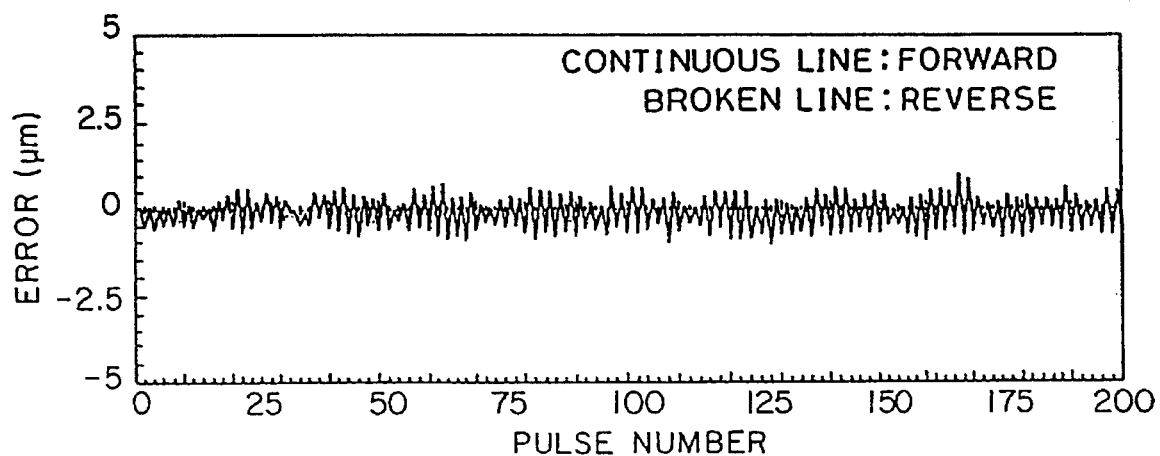

FIG. 37 shows experimental data in the above-mentioned lead screw embodiment. The head is moved bi-directionally by 200 steps in fine moving of the lead screw method. FIG. 37 shows cumulative moving error during this movement (FIG. 37(a)) and moving error per step (FIG. 37(b)).

In FIGS. 37(a) and 37(b), the continuous lines show error for forward moving of the carriage, and the broken lines show error for reverse moving of the carriage.

Embodiment 3.

Figure 38:
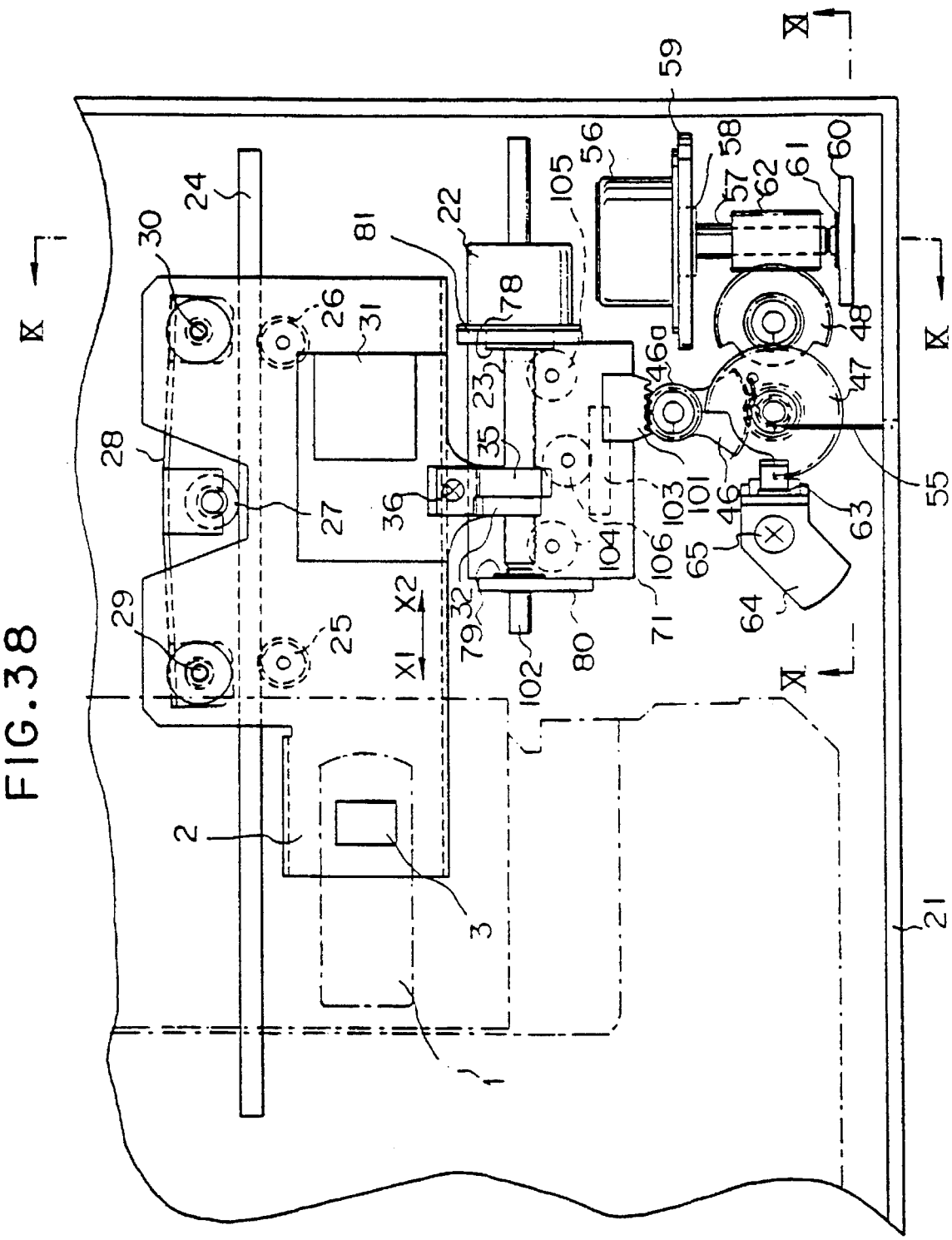
FIG. 38 shows a plan view of the main part of the head positioning mechanism in case that this invention is applied to the flexible disk drive unit in relation to Embodiment 3.

In the above embodiment 2, the STM holder 71 is moved by the second needle 87, provided with the STM holder 71, and the second lead screw 83. The same effect with the above embodiment can be achieved when a rack 101, provided with the STM holder 71, and a speed reducing mechanism by gears such as the gear 46 are used as shown in FIG. 38.

Figure 39:
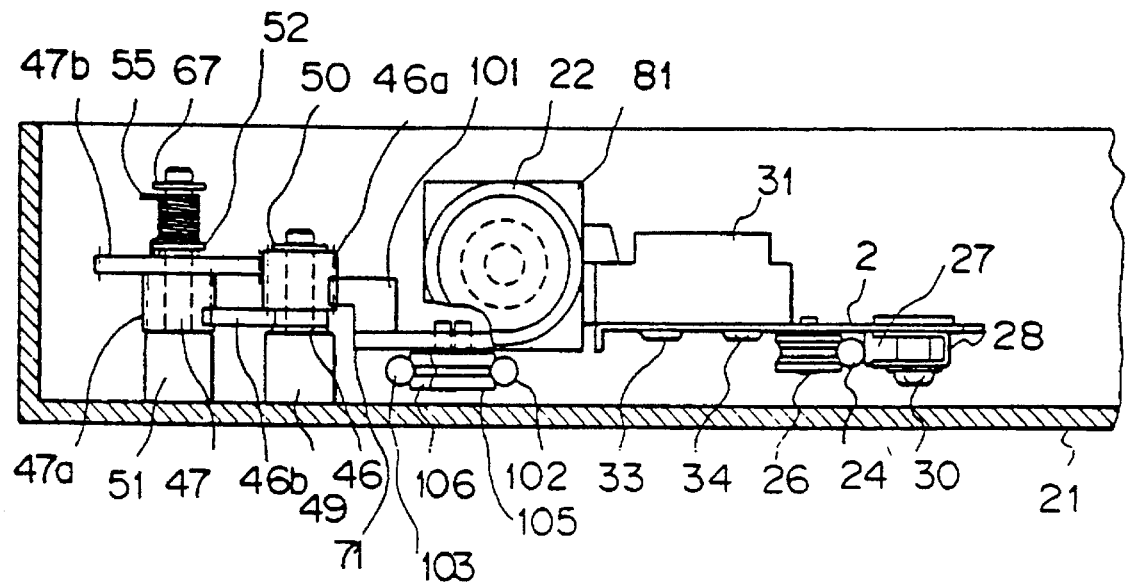
FIG. 39 shows a sectional drawing of the main part taken on line IX—IX of FIG. 38.
Figure 40:
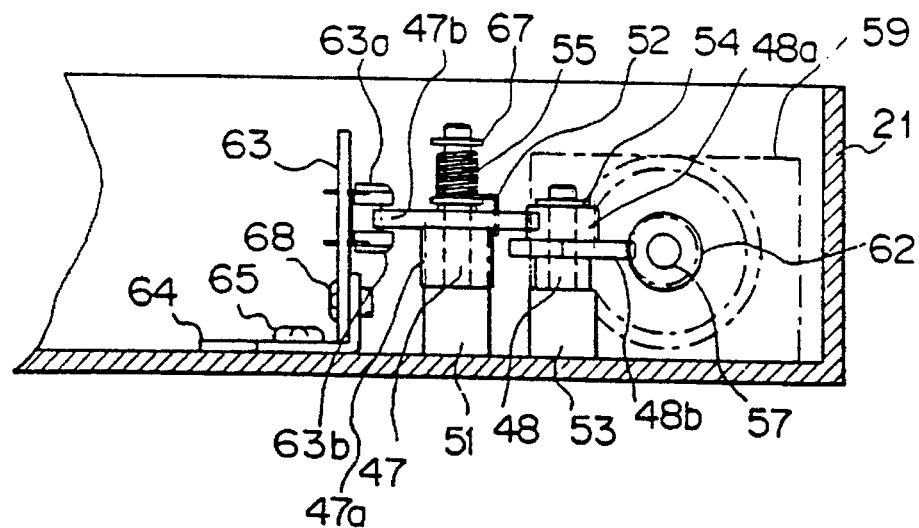
FIG. 40 shows a sectional drawing of the main part taken on line XI—XI of FIG. 38.
Figure 41:
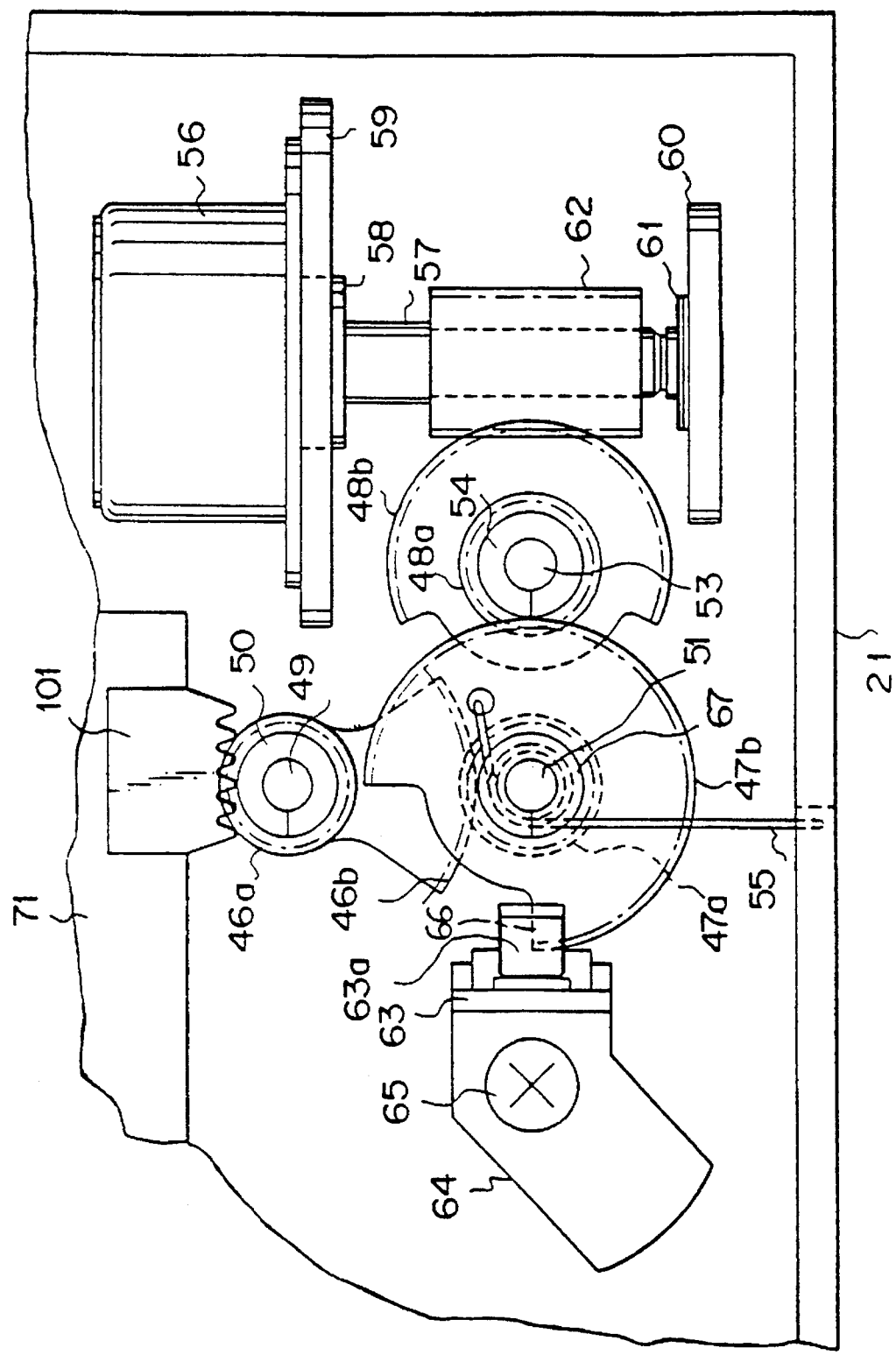
FIG. 41 shows a part expansion plan of FIG. 38.

This embodiment is called "plane rack method" and is explained below. FIG. 38 is a plan view of the main part of the head positioning mechanism being applied to a flexible disk drive unit. FIG. 39 is a sectional drawing of the main part taken on line IX—IX of FIG. 38. FIG. 40 is a sectional drawing of the main part taken on line XI—XI of FIG. 38. FIG. 41 is a part expansion plan of FIG. 38. The same signs are used for the same or similar parts to the above embodiment 1, and they are not explained here, for clarity sake.

A rack 101 is provided with the STM holder 71 and is engaged with the gear 46a. A second guide rod 102 is fixed to the frame 21 so that the second guide rod can be parallel to the lead screw 23. A third guide rod 103 is also fixed to the frame 21 so that the third guide rod can be parallel to the lead screw 23. Roller bearings 104, 105 are provided with the STM holder 71, and they have a V-shaped groove in their lap sides for contacting the second guide rod 102. Roller bearing 106 is provided with the STM holder 71, and it has a V-shaped groove on its lap side for contacting the third guide rod 103. The STM holder 71 is supported by the roller bearings 104, 105, contacted to the second guide rod 102 and the roller bearing 106 contacted to the third guide rod 103 so that the holder 71 can be moved bi-directionally, as shown by arrows X1, X2.

The following is an operation explained. The first lead screw 23 is rotated by the first STM 22. The carriage 2 can be moved bi-directionally, as shown by X1, X2, by this rotation. Thus, the head 3 can be positioned coarsely. On the other hand, a rotation of the worm gear 62 by the second STM 56 causes the third gear 48, the second gear 47, and the first gear 46 rotate. The gear 46a is engaged with the rack 101, and the STM holder 71 is moved bi-directionally, as shown by arrows X1, X2. With this movement, the carriage 2 is moved bi-directionally, as shown by arrows X1, X2. Thus, the head 3 can be positioned finely. This is because the speed of the rotation of the second STM 56 is reduced by the worm gear 62, the third gear 48, the second gear 47, and the first gear 46, and the speed-reduced rotation is transmitted to the STM holder 71. Both the first lead screw 23 and the first STM 22 are mounted on the STM holder 71, driven by the second STM 56, so that coarse positioning and fine positioning of the head 3 can be operated independently, and these operations do not interfere mutually. Furthermore, the standard position for positioning the head 3 can be detected by the photo interrupter 63.

As described above, the speed of the rotation of the second STM 56 is reduced by the worm gear 62, the third gear 48, the second gear 47, and the first gear 46, and the speed-reduced rotation is transmitted to the rack 101. Thus, the desired fine moving accuracy of the head 3 is easy to attain.

Each backlash of the worm gear 62, the third gear 48, the second gear 47, the first gear 46, and the rack 101 is eliminated by the bias spring 55. The hysteresis is thus hard to arise for moving the head 3 in the X1, X2 direction.

Because the fine positioning mechanism is configured fundamentally by a train of gears, it can be fitted to a small-sized apparatus and assembling the apparatus is easy.

Furthermore, the standard position for fine positioning can be detected by the photo interrupter 63. The head 3 is thus moved coarsely to the target position by the first STM 22 and can be moved finely to the target position by the second STM 56 by open loop control, when the control unit, not shown, has an address information of the first STM 22 and the second STM 56 for the target position. Thus, the circuit can be simplified. Because the head 3 can be moved to the desired position by open loop control, it is possible to write on the desired position of the flexible disk 1 even if the location information is not recorded on the flexible disk 1.

As described above, the head is positioned finely by moving the holder, supporting the coarse STM, in the "plane rack method" as well as in the "lead screw method". The rack is fixed to the holder for this movement, and the speed of the rotation of the fine STM is reduced by gear train as well as "cylindrical rack method". Roller bearings are used as guide bearings, and two guide rods are needed. This plane rack method is an intermediate method between the cylindrical rack method and the lead screw method.

Embodiment 4.

Figure 42:
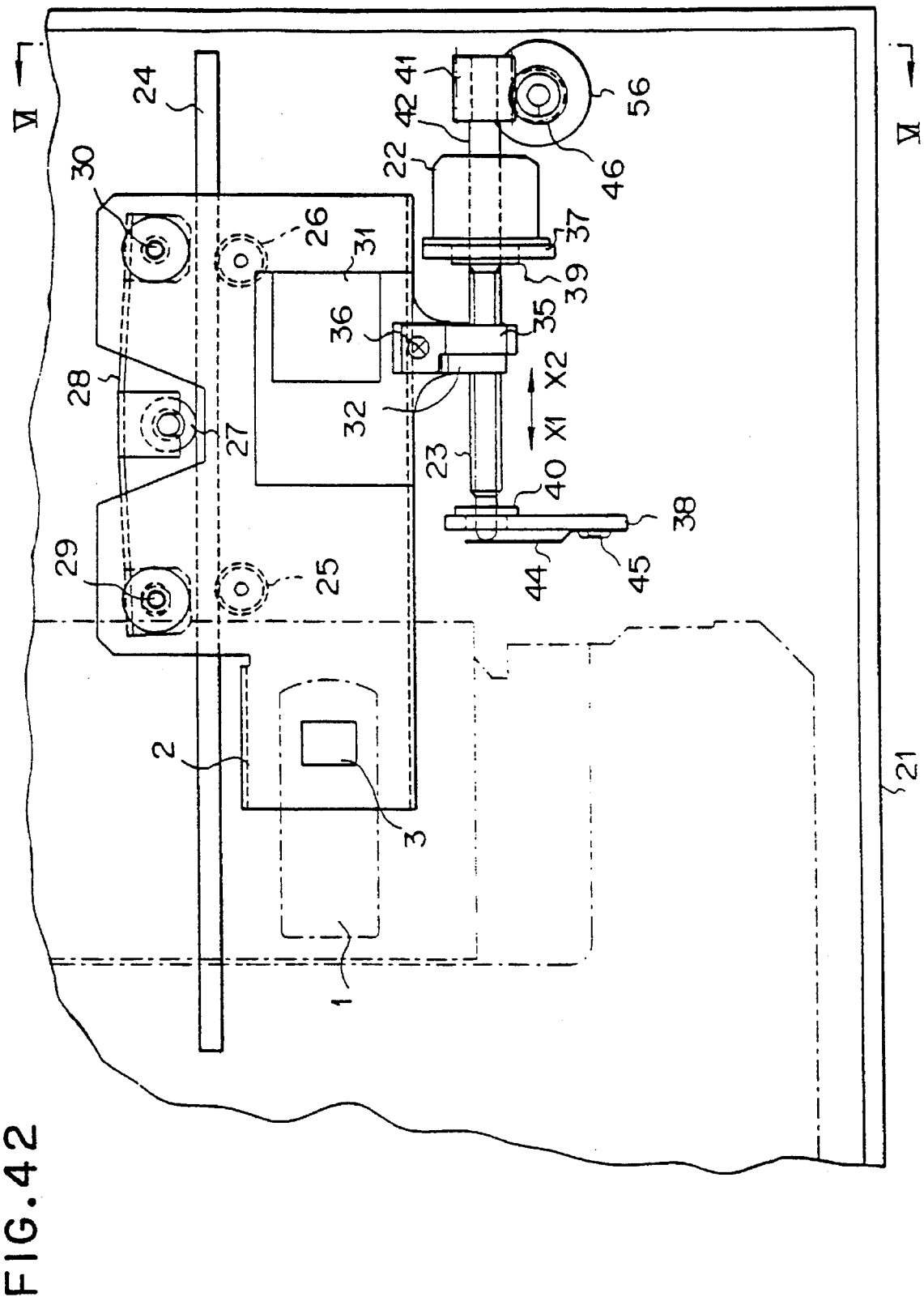
FIG. 42 shows a plan view of the main part of the head positioning mechanism in case that this invention is applied to the flexible disk drive unit in relation to Embodiment 4.
Figure 43:
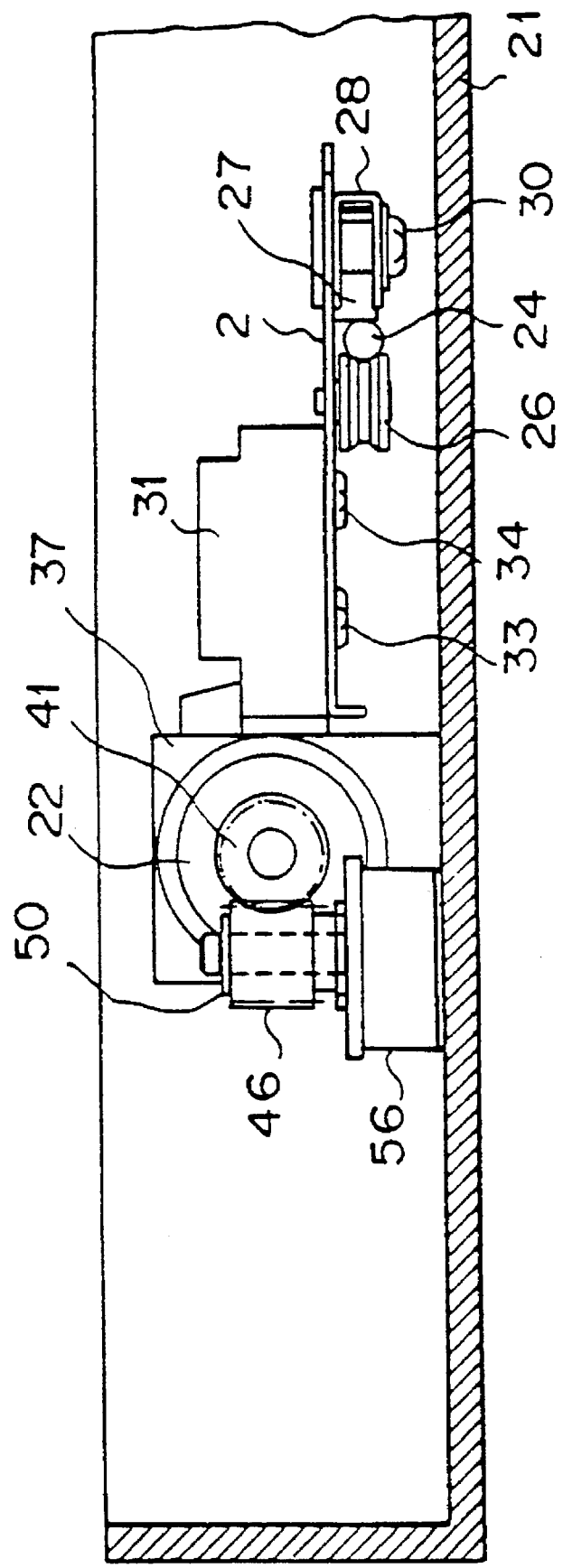
FIG. 43 shows a sectional drawing of the main part taken on line VI—VI of FIG. 42.

The following is another embodiment of this invention, explained in reference to FIGS. 42, 43.

In FIGS. 42, 43, the different aspect from FIG. 1 is that the first gear 46 is provided with an axis of the second STM 56 directly and the first gear 46 is engaged with the cylindrical rack 41.

In the embodiment 1, gears are used for a speed reducing mechanism in the fine moving mechanism. In this embodiment, the first gear 46 is rotated directly by a rotation of the second STM 56. The cylindrical rack 41 is thus moved finely in X1, X2 direction.

When a head moving apparatus is configured as shown in FIGS. 42, 43, gears for the speed reducing mechanism are not used and the configuration becomes simple. Two motors of the same specifications can be used for both the first STM 22 and the second STM 56, though this is not described above. In addition, two motors having different degree of rotation per step can also be used when positioning the head in this embodiment.

Embodiment 5.

Figure 44:
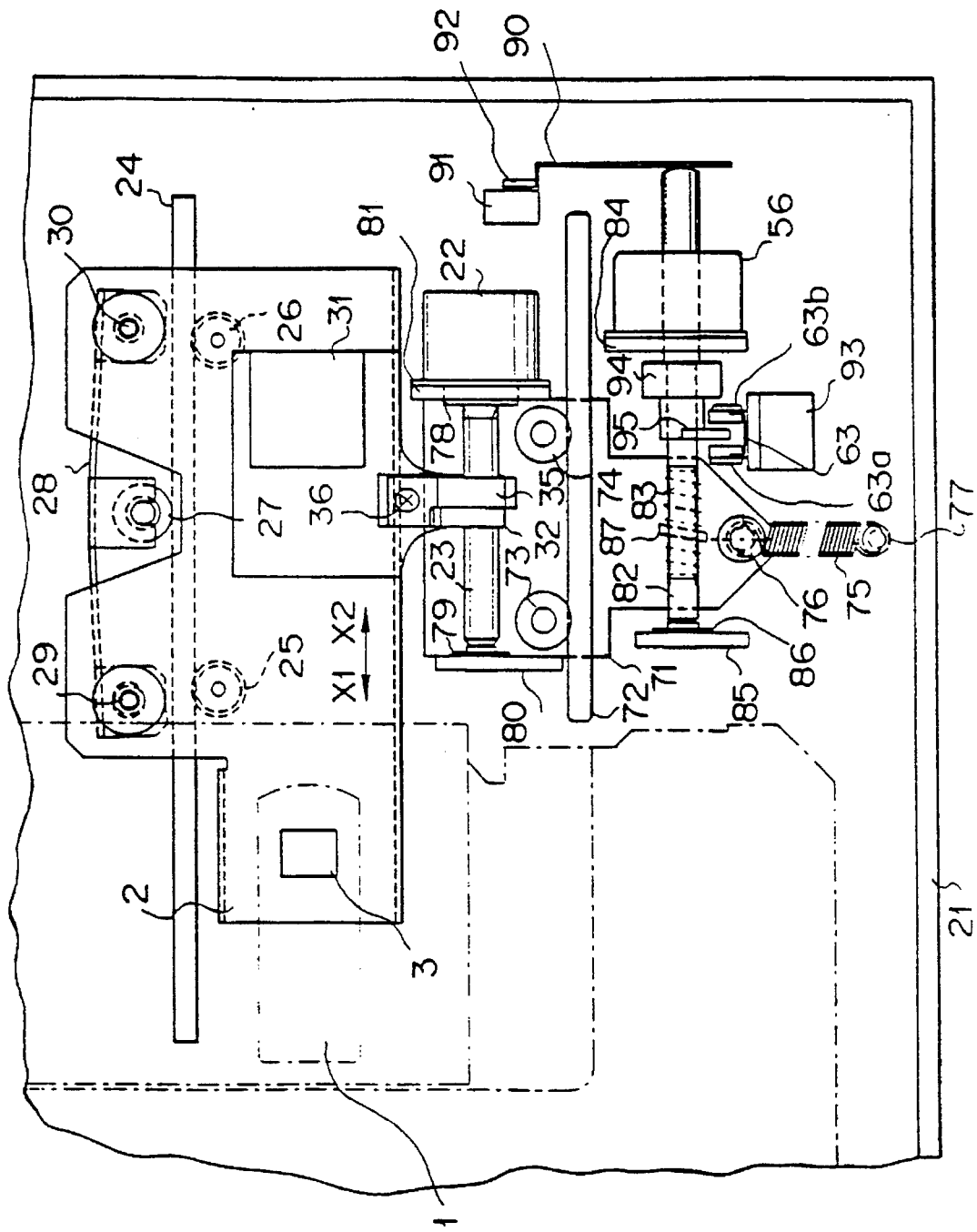
FIG. 44 shows a plan view of the main part of the head positioning mechanism in case that this invention is applied to the flexible disk unit in relation to Embodiment 5.

The following is another embodiment of this invention explained in reference to FIG. 44.

As shown in FIG. 44, the different aspect from the embodiment 2 is that the rotation of the second STM 56 is not transmitted to the second lead screw through the speed reducing mechanism of gears, but is transmitted directly to the second lead screw, formed on the extended shaft of the second STM 56. In this way, when the second lead screw is formed on the extended shaft of the second STM 56, the specifications of the second STM 56 is desired to be different from the specifications of the first STM because the speed reducing mechanism is not comprised. For example, two motors having different degree of rotation per step can be used. Or, the moving accuracy of the first lead screw can be different than the second lead screw using two lead screws having different flute pitch.

Embodiment 6.

Figure 45:
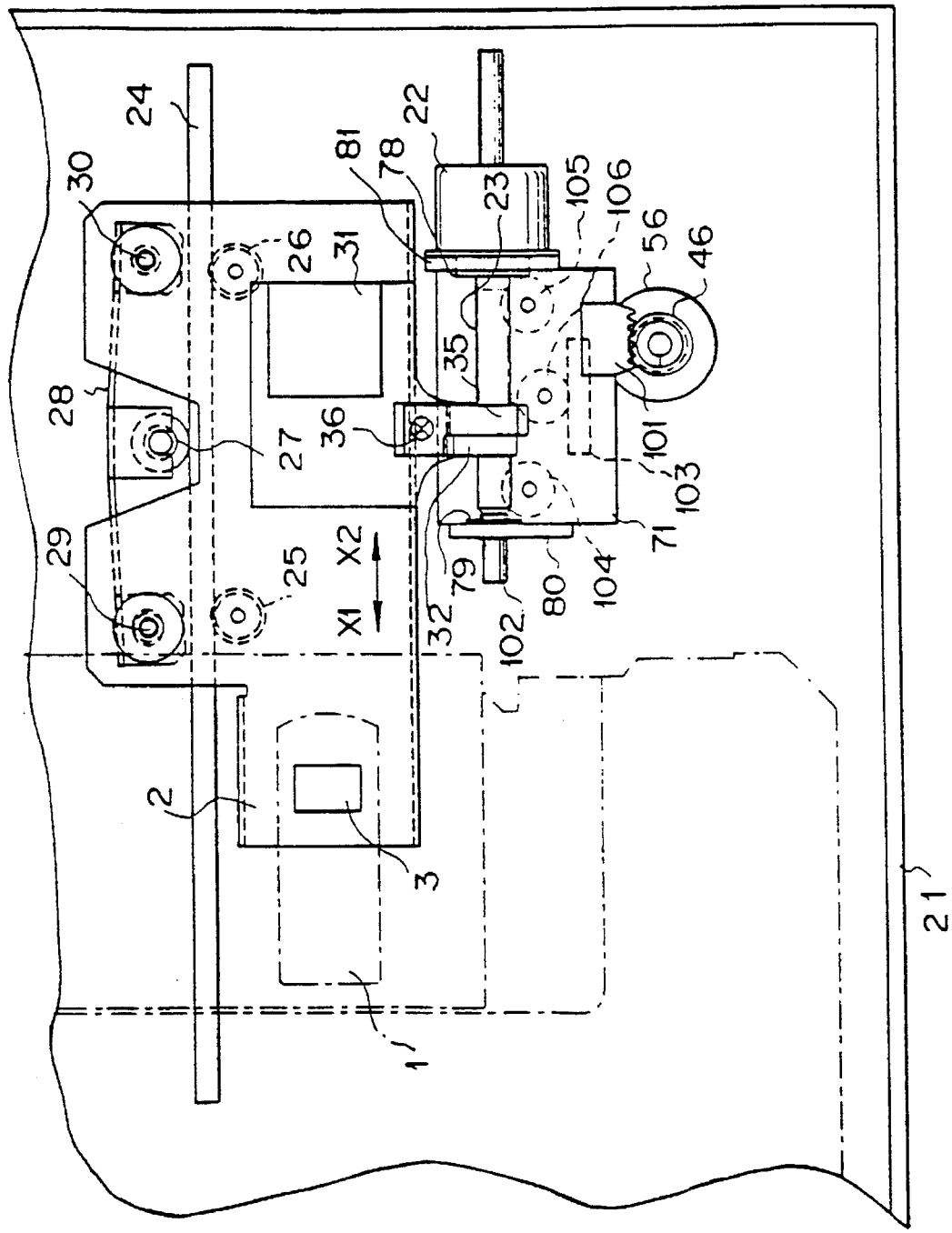
FIG. 45 shows a plan view of the main part of the head positioning mechanism in case that this invention is applied to the flexible disk unit in relation to Embodiment 6.

The following is another embodiment of this invention explained in reference to FIG. 45.

In FIG. 45, the different aspect from the embodiment 3 is that the first gear 46 is provided with the second STM 56 directly and engaged with the rack 101. Namely, the speed reducing mechanism is not comprised in this embodiment and the rack is moved directly by the rotation of the motor. In this case, the moving accuracy of the carriage can be also changed using two motors having different degree of rotation as well as the above embodiments 4 and 5.

Embodiment 7.

Figure 46:
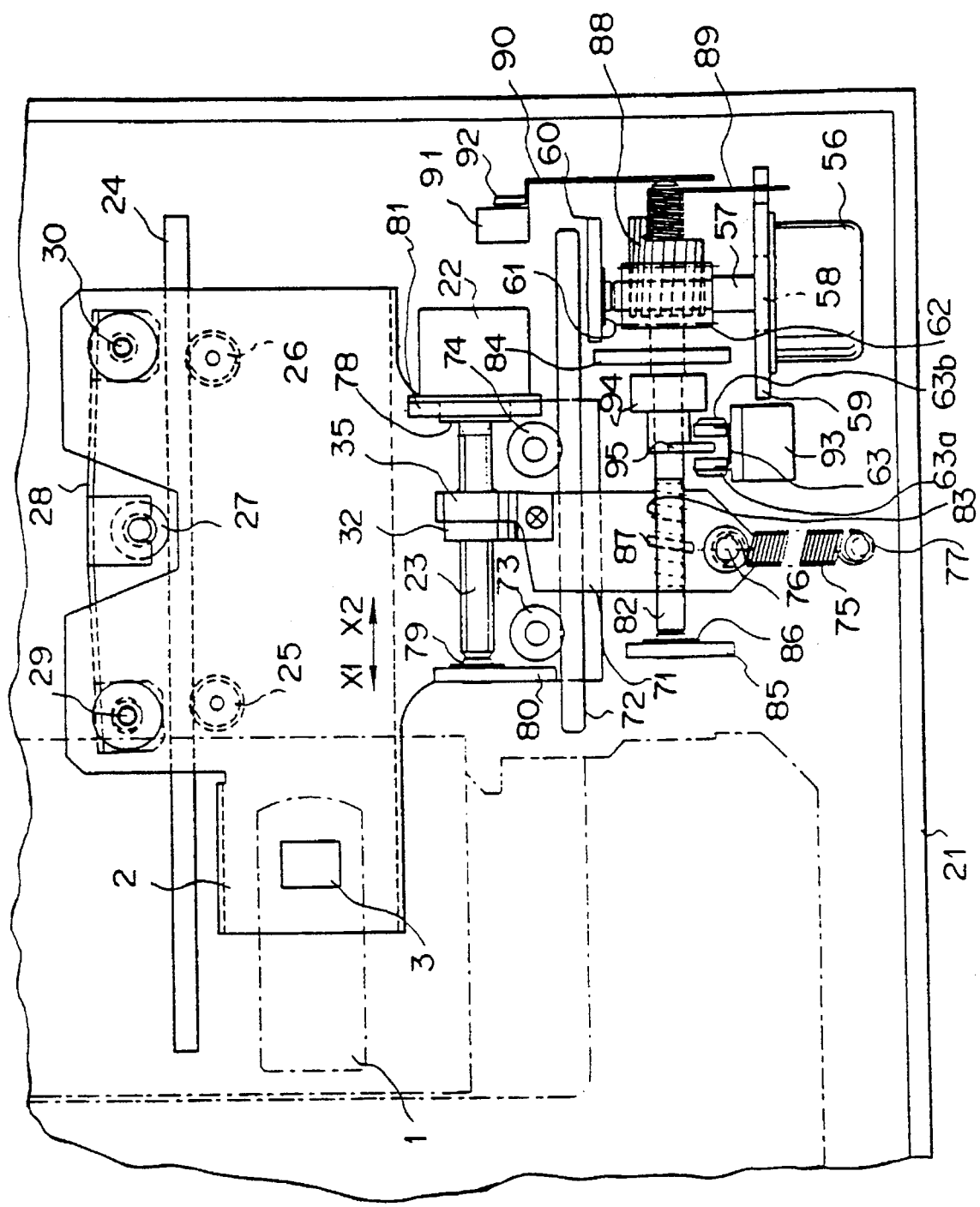
FIG. 46 shows a plan view of the main part of the head positioning mechanism in case that this invention is applied to the flexible disk unit in relation to Embodiment 7.

The following is another embodiment of this invention explained in reference to FIG. 46.

In FIG. 46, the different aspect from the above embodiments 1~6 is that the first STM 22 is fixed to the carriage 2. Accordingly, the first STM 22 and the first lead screw 23 are moved with the movement of the carriage. The first lead screw 23 is engaged with the needle part 32. The needle part 32 is fixed to one end of the holder 71. The second needle 87 is engaged with the second lead screw 83. The preload spring 75 are provided with the other end of the holder 71 as well as in the above embodiment 2.

The preload spring 75 biases the holder 71 to the upper front side direction (as shown by X5 in FIG. 25). The needle part 32 is engaged with the first lead screw 23, and the second needle 87 is engaged with the second lead screw 83. These engaged parts do not get detached because of the spring force of the preload spring 75.

When the first STM 22 rotates on the above conditions, the carriage 2 is moved bi-directionally, as shown by X1, X2, because the needle part 32 is fixed. On the other hand, when the second STM 56 rotates, the holder 71 is moved in the X1, X2 direction because the second needle 87 is engaged with the second lead screw 83. Accordingly, the needle part 32 is also moved with the movement of the holder 71. The first STM fixed to the carriage 2 is moved through the second head screw 83. Thus the carriage is moved finely and bi-directionally, as shown by X1, X2.
Embodiment 8.

Figure 47:
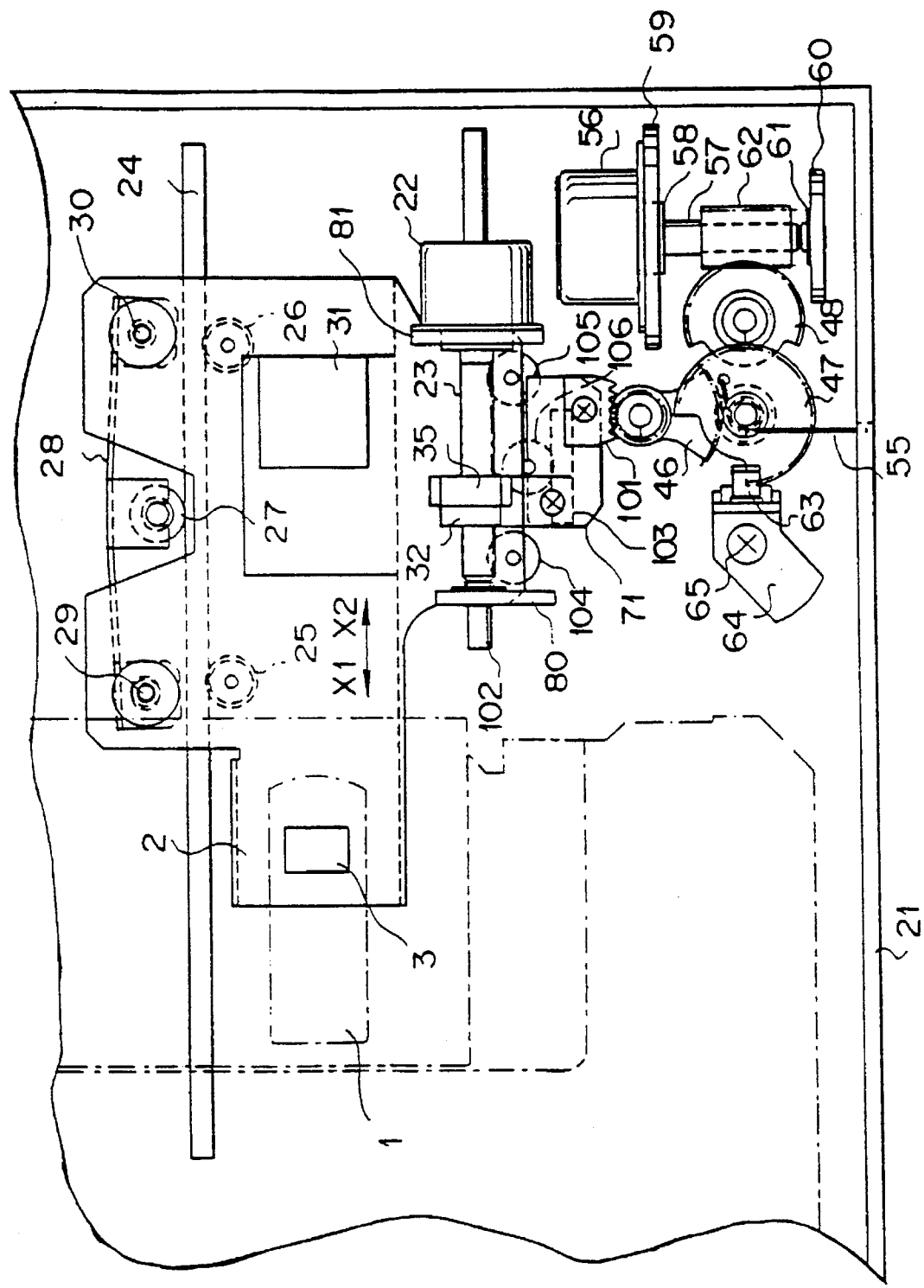
FIG. 47 shows a plan view of the main part of the head positioning mechanism in case that this invention is applied to the flexible disk unit in relation to Embodiment 8.

The following is another embodiment of this invention explained in reference to FIG. 47.

In FIG. 47, the different aspect from the above embodiments 1~6 is that the first STM 22 is fixed to the carriage 2. In addition, the needle part 32 and the rack 101 are fixed to the holder 71. The holder 71 is supported by the roller bearing 106 and the third guide rod 103 so as to be possible to move in the X1, X2 direction.

When the first STM 22 rotates, the first STM 22 itself also moves in the X1, X2 direction because the needle part 32 is fixed. The carriage 2 is also moved. When the second STM 56 rotates, the rack 101 is moved in the X1, X2 direction. Thus, the needle part 32 is moved in the X1, X2 direction, and the head screw 23 is also moved. Accordingly, the carriage 2 is moved finely in the X1, X2 direction.
Embodiment 9.

Figure 48A:
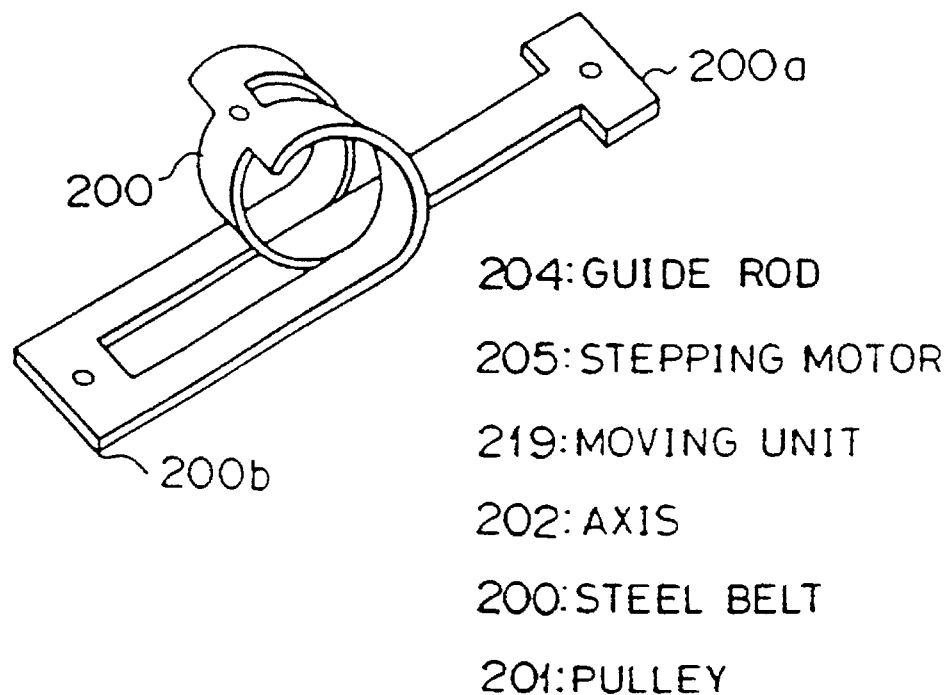
FIGS. 48a and 48b explain Embodiment 9 of this invention.
Figure 48B:
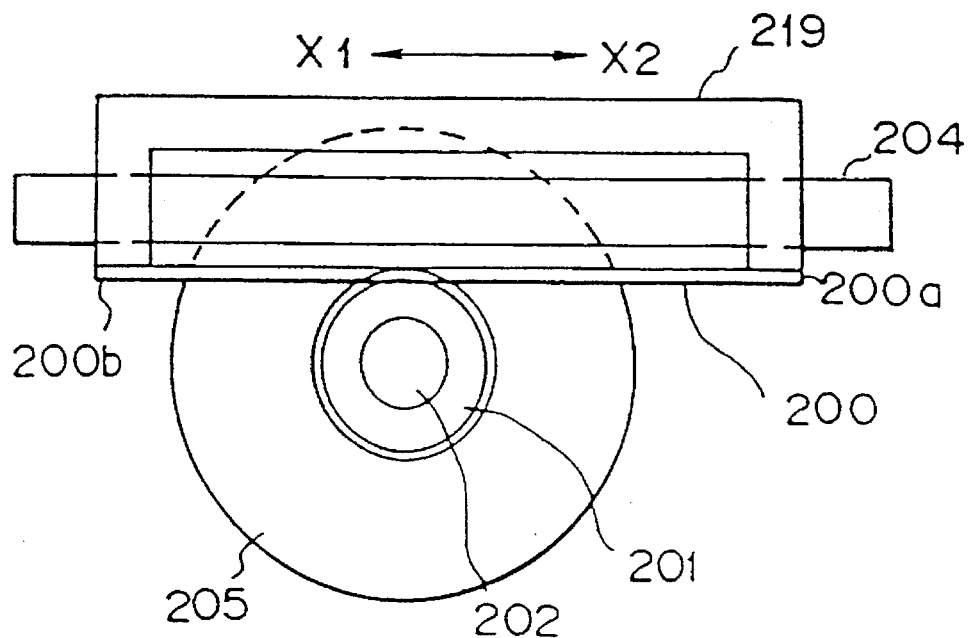

In the above embodiments 1~8, lead screws are used for the first and the second drive means. Other means can be used for converting a rotation of a motor to rectilinear motion. FIG. 48 shows the case that a steel belt 200 is used for converting a rotation of a motor to rectilinear motion. A moving unit 219 can be moved in the X1, X2 direction along a guide rod 204 by providing a pulley 201 with a stepping motor 205 and setting the steel belt 200 around the pulley 201, as shown in FIG. 48. Using this method, the same effect with the above embodiments can be attained.
Embodiment 10.

Figure 49:
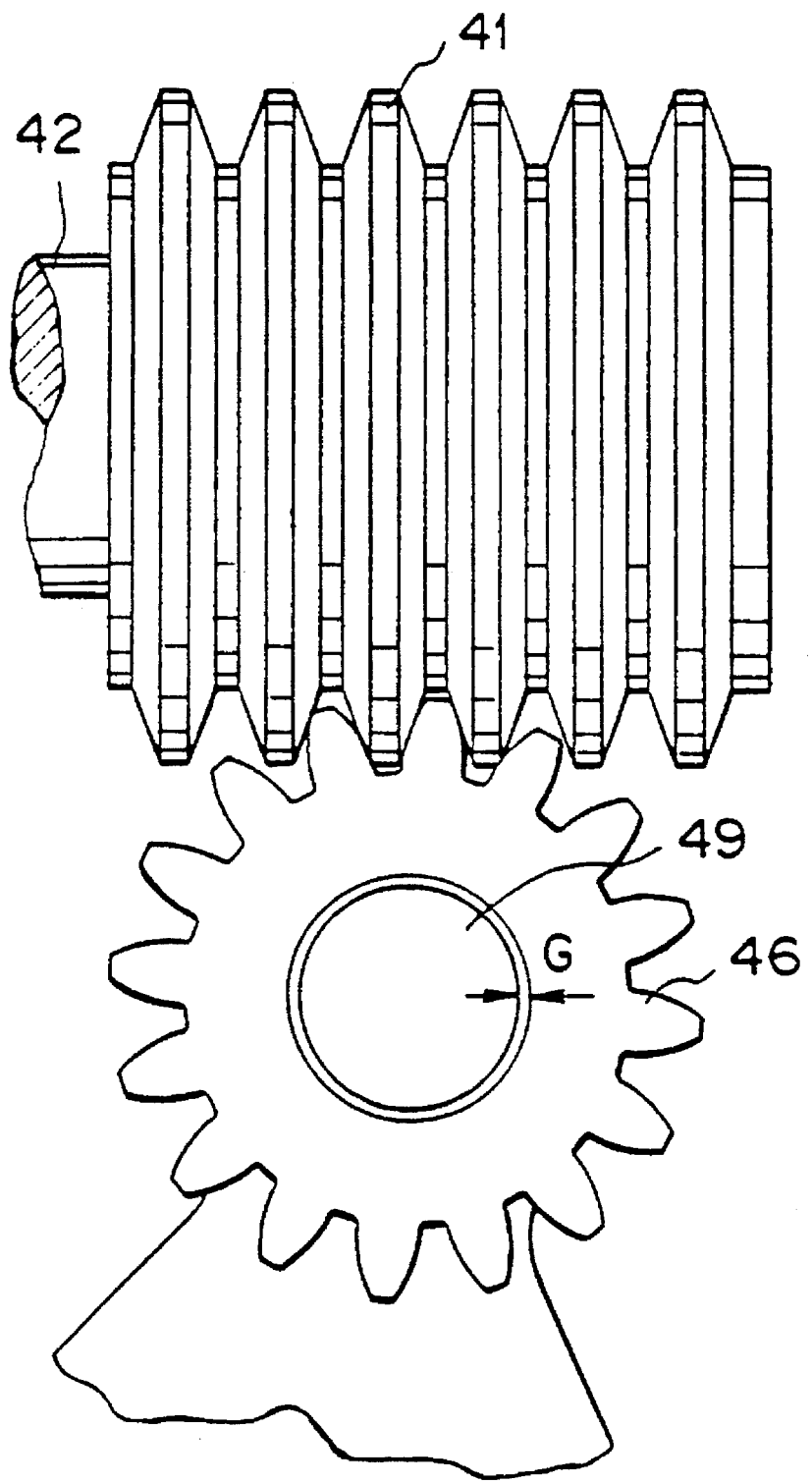
FIG. 49 explains the cylindrical rack and the gears in relation to Embodiment 10 of this invention.
Figure 50:
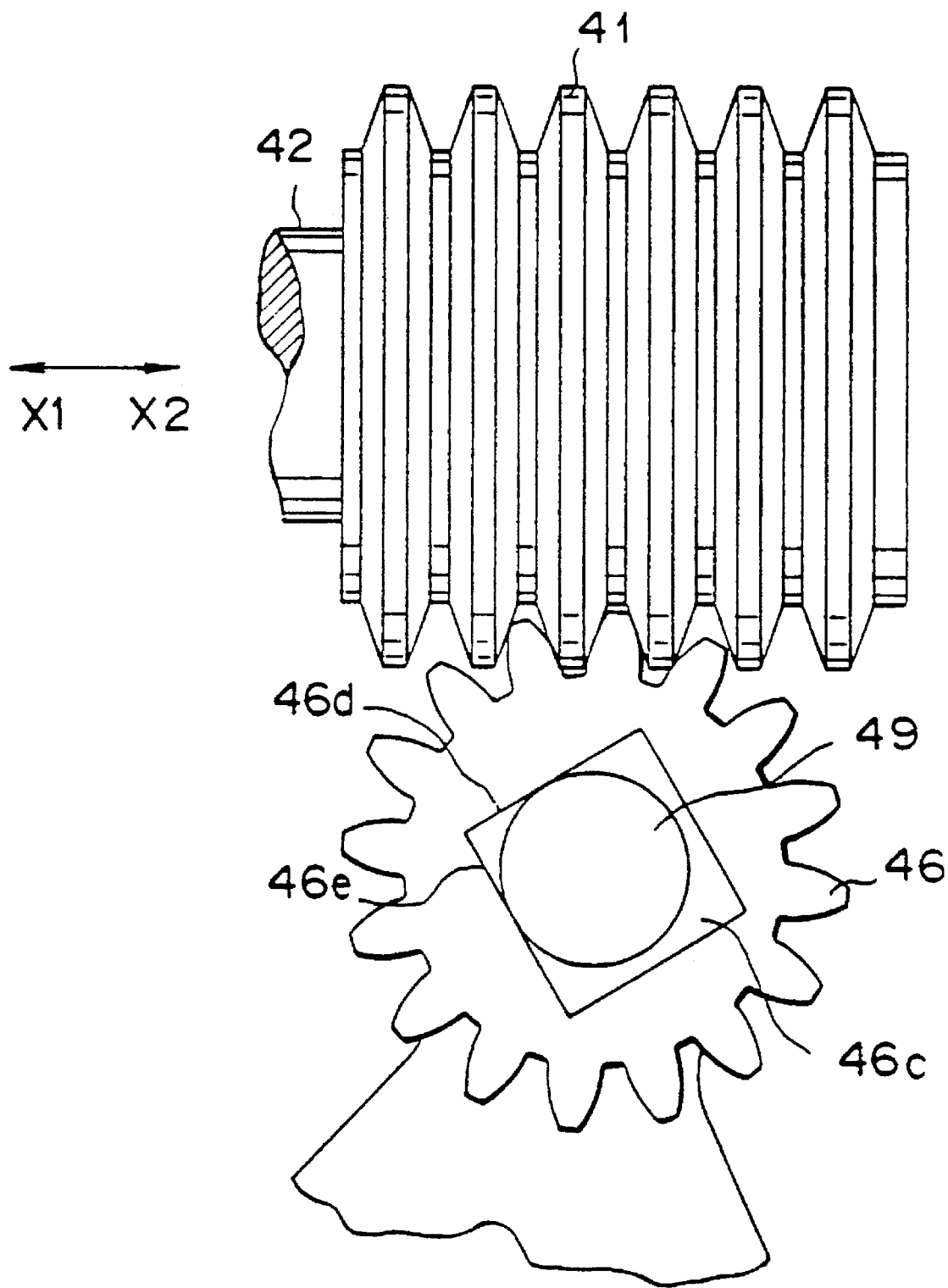
FIG. 50 explains the cylindrical rack and the gears in relation to Embodiment 10 of this invention.
Figure 51:
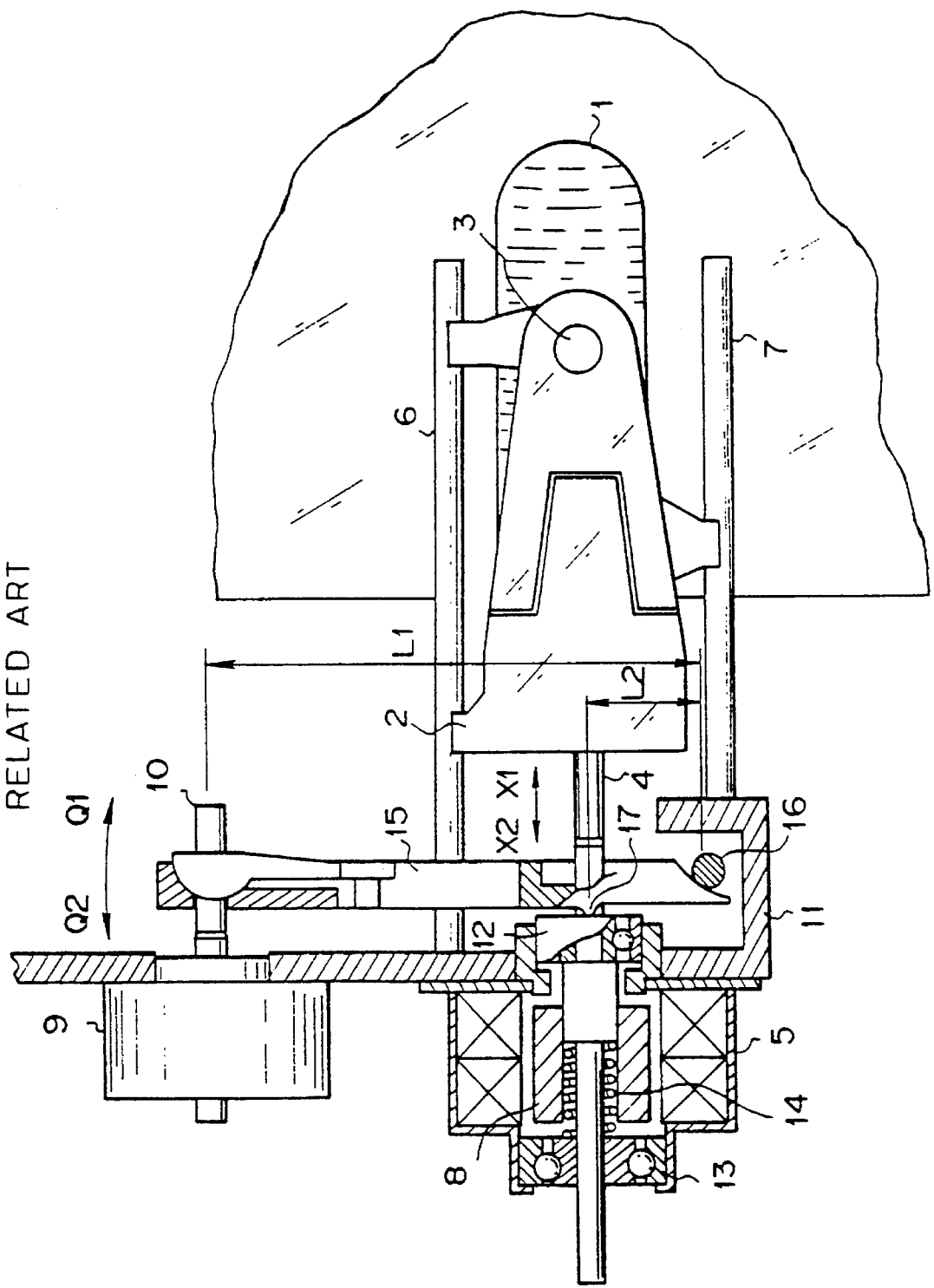
FIG. 51 shows a plan view in case of applying the conventional art to the head moving mechanism of a flexible disk drive unit.
Figure 52:
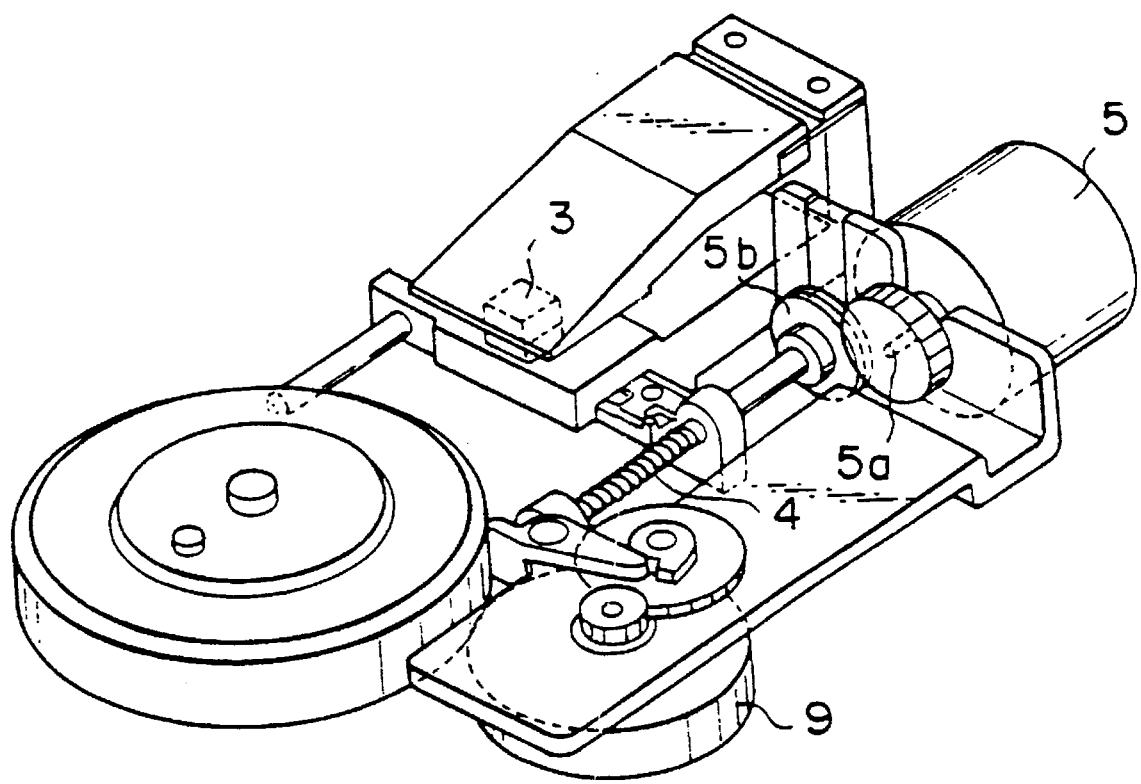
FIG. 52 shows a perspective view in case of applying the conventional art to the head moving mechanism of a flexible disk drive unit.

The following is another embodiment explained in reference to FIGS. 49, 50.

There exists a microscopic gap G between the post 49 and the first gear 46 as shown in FIG. 49. This gap G causes a pivot center swing when the first gear 46 pivots, thus influencing the fine moving accuracy. This may be experienced because of friction between the post 49 and the first gear 46.

For eliminating the above influence, the bearing of the first gear 46 engaged with the post 49 has a square via 46c. Two flat planes 46d, 46e of the square via 46c always need to be biased for contacting the post 49. As mentioned above, the cylindrical rack 41 is biased by the bias spring 44 for lead screw to the direction of arrow X2. Accordingly, the bias force for these planes 46d, 46e for contacting the post 49 can be achieved without any additional bias means.

This type of bearing which has a square via can be used for the above embodiments 1 and 3.

In this way, in the embodiment 1 and embodiment 3 (cylindrical rack method and plane rack method), a gap between a gear and an axis can be eliminated by forming the hole of the last stage gear (the first gear) into a square via and the moving accuracy can be thus improved.
Embodiment 11.

In the above embodiments, the first drive means operates coarse moving and the second drive means operates fine moving. The apparatus also can be configured to have the first drive means for fine moving and the second drive means for coarse moving.

Specifications oaf coarse moving and fine moving can be varied by combination of following factors: angle of rotation of stepping motors, pitch of lead screws, the speed reducing mechanism of gears, etc. For example, the first drive means can operate fine moving by providing the speed reducing mechanism with the first drive means.
Embodiment 12.

In the above embodiments, the detect means for detecting the standard position for moving is provided with the second drive means. The standard position for moving is placed in the drive means that operates fine moving, so that the detect means may be provided with the first drive means when the first drive means operates fine moving.

In the above embodiments, the photo interrupter is used as the detect means for detecting the notch of the gear 47. Other means can be used for the detect means as well as the photo interrupter. For example, a mechanical sensor can be used for detecting the standard position.
Embodiment 13.

In the above embodiments, the invention is explained as it applies to a flexible disk drive unit. This invention can also be applied to the head positioning apparatus of a fixed magnetic disk drive unit, an optical disk drive unit, a CD player, etc. Furthermore, this invention can be not only applied to the case that a head reads from/writes on these recording media, but also applied to the case that a head needs to be moved both coarsely and finely for a certain media.

The present invention has been described in connection with a number of specific embodiments thereof. Numerous extensions, modifications, and variations obvious to those skills in the art are also contemplated by the invention. Thus, the above description is given by way of example, only, and the present invention is not to be limited thereby, but to be limited only by the scope of the appended claims.

What is claimed is:

1. A head positioning apparatus for moving and positioning a head over a media, comprising:

(a) a carriage for mounting the head;

(b) first drive means including a motor having a shaft supporting a lead screw having an axis for rotation, said lead screw disposed to a first side of the motor and engaging with the carriage, wherein rotation of the lead screw by the first drive means causes the carriage to move;

(c) a cylindrical rack attached to the shaft supporting the lead screw as a rotor formed by a rotation of a rack around the axis of the shaft and disposed to a second side of the motor away from the lead screw;

(d) a gear, mounted on a post, engaging with the cylindrical rack; and (e) second drive means for driving the gear to move the cylindrical rack bi-directionally along the axis of the lead screw;

wherein the gear has a bearing providing a square having two flat planes biased by a spring acting on the cylindrical rack into contact with the post.

2. A head positioning apparatus for moving and positioning a head over a medium, comprising:

a carriage on which the head is fixedly mounted;

a first motor having a slidable shaft, the shaft including a lead screw engaged with the carriage to cause translational motion of the carriage upon rotation of the lead screw and upon translation of the lead screw, and the shaft further including a cylindrical rack;

a gear engaged with the cylindrical rack to cause translational motion thereof upon rotation of the gear, the gear having a bearing surface comprised of two flat planes biased by a spring acting on the cylindrical rack into contact with a supporting shaft; and a second motor engaged to the gear through at least one drive gear.

3. The head positioning apparatus of claim 2, wherein the gear has a bearing providing a square via having two flat planes touching to biased by a spring acting on the cylindrical rack into contact with the gear axis.

4. The head positioning apparatus of claim 2, wherein the second motor engages the gear through at least one additional gear.

5. The head positioning apparatus of claim 2, wherein the second motor includes a shaft and the second motor engages the gear through a direct connection with the shaft.

* * * * *